(12) United States Patent
Lavian et al.

(10) Patent No.: US 8,572,303 B2
(45) Date of Patent: Oct. 29, 2013

(54) PORTABLE UNIVERSAL COMMUNICATION DEVICE

(76) Inventors: Tal Lavian, Sunnyvale, CA (US); Zvi Or-Bach, San Jose, CA (US)

(*) Notice: Subject to any disclaimer, the term of this patent is extended or adjusted under 35 U.S.C. 154(b) by 280 days.

(21) Appl. No.: 13/113,825

(22) Filed: May 23, 2011

(65) Prior Publication Data
US 2011/0225330 A1 Sep. 15, 2011

Related U.S. Application Data

(63) Continuation-in-part of application No. 12/699,618, filed on Feb. 3, 2010.

(51) Int. Cl.
*G06F 13/00* (2006.01)
*G06F 3/00* (2006.01)

(52) U.S. Cl.
USPC ............ 710/72; 710/2; 710/5; 710/8; 710/15; 710/18

(58) Field of Classification Search
None
See application file for complete search history.

(56) References Cited

U.S. PATENT DOCUMENTS

| | | | |
|---|---|---|---|
| 4,653,045 A | 3/1987 | Stanley et al. |
| 4,736,405 A | 4/1988 | Akiyama |
| 4,897,866 A | 1/1990 | Majmudar et al. |
| 5,006,987 A | 4/1991 | Harles |
| 5,007,429 A | 4/1991 | Treatch et al. |
| 5,027,400 A | 6/1991 | Baji et al. |
| 5,086,385 A | 2/1992 | Launey et al. |
| 5,144,548 A | 9/1992 | Salandro |
| 5,265,014 A | 11/1993 | Haddock et al. |
| 5,294,229 A | 3/1994 | Hartzell et al. |
| 5,335,276 A | 8/1994 | Thompson et al. |
| 5,416,831 A | 5/1995 | Chewning, III et al. |
| 5,417,575 A | 5/1995 | McTaggart |
| 5,422,809 A | 6/1995 | Griffin et al. |
| 5,465,213 A | 11/1995 | Ross |

(Continued)

FOREIGN PATENT DOCUMENTS

| | | |
|---|---|---|
| EP | 1225754 A3 | 7/2003 |
| EP | 1001597 A3 | 9/2003 |

(Continued)

OTHER PUBLICATIONS

Yin, M. and Zhai, S., "The Benefits of Augmenting Telephone Voice Menu Navigation with Visual Browsing and Search," CHI'06 Proceedings of the SIGCHI conference on Human Factors in computing systems: pp. 319-328, ACM, Montreal, Canada (Apr. 2006).

(Continued)

*Primary Examiner* — Scott Sun

(57) ABSTRACT

Embodiments of the invention provide a portable device comprising at least one processor. The portable device also comprises a memory coupled to the processor comprising data. Further, the portable device comprises a detector configured to detect at least one external device. The at least one external device is configured to connect to the portable device. Further, the portable device comprises an interface to connect to the at least one external device. The interface is configured to transmit or receive one or more control signals excluding the data. Furthermore, the portable device comprises a controller configured to enable controlling of the portable device from the at least one external device; and controlling of the at least one external device from the portable device through the interface.

18 Claims, 27 Drawing Sheets

(56) References Cited

U.S. PATENT DOCUMENTS

| | | |
|---|---|---|
| 5,465,401 A | 11/1995 | Thompson |
| 5,475,399 A | 12/1995 | Borsuk |
| 5,499,330 A | 3/1996 | Lucas et al. |
| 5,519,809 A | 5/1996 | Husseiny et al. |
| 5,533,102 A | 7/1996 | Robinson et al. |
| 5,550,746 A | 8/1996 | Jacobs |
| 5,572,581 A | 11/1996 | Sattar et al. |
| 5,585,858 A | 12/1996 | Harper et al. |
| 5,586,235 A | 12/1996 | Kauffman |
| 5,588,044 A | 12/1996 | Lofgren et al. |
| 5,592,538 A | 1/1997 | Kosowsky et al. |
| 5,606,361 A | 2/1997 | Davidsohn et al. |
| 5,633,909 A | 5/1997 | Fitch |
| 5,633,916 A | 5/1997 | Goldhagen et al. |
| 5,657,221 A | 8/1997 | Warman et al. |
| 5,689,648 A | 11/1997 | Diaz et al. |
| 5,724,412 A | 3/1998 | Srinivasan |
| 5,739,814 A | 4/1998 | Ohara et al. |
| 5,740,549 A | 4/1998 | Reilly et al. |
| 5,768,142 A | 6/1998 | Jacobs |
| 5,790,652 A | 8/1998 | Gulley et al. |
| 5,794,205 A | 8/1998 | Walters et al. |
| 5,796,806 A | 8/1998 | Birckbichler |
| 5,802,283 A | 9/1998 | Grady et al. |
| 5,802,526 A | 9/1998 | Fawcett et al. |
| 5,807,336 A | 9/1998 | Russo et al. |
| 5,819,225 A | 10/1998 | Eastwood et al. |
| 5,822,404 A | 10/1998 | Cave |
| 5,822,405 A | 10/1998 | Astarabadi |
| 5,838,682 A | 11/1998 | Dekelbaum et al. |
| 5,838,775 A | 11/1998 | Montalbano |
| 5,867,816 A | 2/1999 | Nussbaum |
| 5,873,068 A | 2/1999 | Beaumont et al. |
| 5,885,083 A | 3/1999 | Ferrell |
| 5,885,245 A | 3/1999 | Lynch et al. |
| 5,890,123 A | 3/1999 | Brown et al. |
| 5,892,813 A | 4/1999 | Morin et al. |
| 5,907,793 A | 5/1999 | Reams |
| 5,912,952 A | 6/1999 | Brendzel |
| 5,913,195 A | 6/1999 | Weeren et al. |
| 5,920,477 A | 7/1999 | Hoffberg et al. |
| 5,937,040 A | 8/1999 | Wrede et al. |
| 5,940,488 A | 8/1999 | DeGrazia et al. |
| 5,948,040 A | 9/1999 | DeLorme et al. |
| 5,956,034 A | 9/1999 | Sachs et al. |
| 5,982,875 A | 11/1999 | Lieben et al. |
| 5,987,103 A | 11/1999 | Martino |
| 6,009,398 A | 12/1999 | Mueller et al. |
| 6,014,428 A | 1/2000 | Wolf |
| 6,020,915 A | 2/2000 | Bruno et al. |
| 6,049,779 A | 4/2000 | Berkson |
| 6,055,513 A | 4/2000 | Katz et al. |
| 6,062,863 A | 5/2000 | Kirksey et al. |
| 6,088,429 A | 7/2000 | Garcia |
| 6,088,712 A | 7/2000 | Huang et al. |
| 6,091,805 A | 7/2000 | Watson |
| 6,091,956 A | 7/2000 | Hollenberg |
| 6,104,790 A | 8/2000 | Narayanaswami |
| 6,144,848 A | 11/2000 | Walsh et al. |
| 6,148,065 A | 11/2000 | Katz |
| 6,169,734 B1 | 1/2001 | Wilson |
| 6,212,547 B1 | 4/2001 | Ludwig et al. |
| 6,228,921 B1 | 5/2001 | Kasemann et al. |
| 6,229,694 B1 | 5/2001 | Kono |
| 6,230,197 B1 | 5/2001 | Beck et al. |
| 6,259,444 B1 | 7/2001 | Palmer et al. |
| 6,263,064 B1 | 7/2001 | O'Neal et al. |
| 6,273,726 B1 | 8/2001 | Kirksey et al. |
| 6,321,198 B1 | 11/2001 | Hank et al. |
| 6,335,678 B1 | 1/2002 | Heutschi |
| 6,366,650 B1 | 4/2002 | Rhie et al. |
| 6,373,817 B1 | 4/2002 | Kung et al. |
| 6,400,807 B1 | 6/2002 | Hewitt et al. |
| 6,405,033 B1 | 6/2002 | Kennedy, III et al. |
| 6,408,301 B1 | 6/2002 | Patton et al. |
| 6,427,063 B1 | 7/2002 | Cook et al. |
| 6,445,694 B1 | 9/2002 | Swartz |
| 6,449,595 B1 | 9/2002 | Arslan et al. |
| 6,456,706 B1 | 9/2002 | Blood et al. |
| 6,460,057 B1 | 10/2002 | Butler et al. |
| 6,463,145 B1 | 10/2002 | O'Neal et al. |
| 6,482,156 B1 | 11/2002 | Iliff |
| 6,505,146 B1 | 1/2003 | Blackmer |
| 6,510,411 B1 | 1/2003 | Norton et al. |
| 6,529,500 B1 | 3/2003 | Pandharipande |
| 6,560,320 B1 | 5/2003 | Paleiov et al. |
| 6,603,840 B2 | 8/2003 | Fellingham et al. |
| 6,606,611 B1 | 8/2003 | Khan |
| 6,606,741 B2 | 8/2003 | Kojima et al. |
| 6,636,835 B2 | 10/2003 | Ragsdale et al. |
| 6,653,930 B1 | 11/2003 | Bonomo et al. |
| 6,658,389 B1 | 12/2003 | Alpdemir |
| 6,705,869 B2 | 3/2004 | Schwartz |
| 6,714,519 B2 | 3/2004 | Luzzatti et al. |
| 6,731,625 B1 | 5/2004 | Eastep et al. |
| 6,754,181 B1 | 6/2004 | Elliott et al. |
| 6,788,770 B1 | 9/2004 | Cook et al. |
| 6,791,583 B2 | 9/2004 | Tang et al. |
| 6,816,580 B2 | 11/2004 | Timmins |
| 6,820,037 B2 | 11/2004 | Simon |
| 6,820,062 B1 | 11/2004 | Gupta et al. |
| 6,826,194 B1 | 11/2004 | Vered et al. |
| 6,829,368 B2 | 12/2004 | Meyer et al. |
| 6,856,673 B1 | 2/2005 | Banks et al. |
| 6,862,713 B1 | 3/2005 | Kraft et al. |
| 6,865,268 B1 | 3/2005 | Matthews et al. |
| 6,885,737 B1 | 4/2005 | Gao et al. |
| 6,889,195 B2 | 5/2005 | Strandberg |
| 6,920,205 B2 | 7/2005 | Hahn et al. |
| 6,920,425 B1 | 7/2005 | Will et al. |
| 6,920,431 B2 | 7/2005 | Showghi et al. |
| 6,937,705 B1 | 8/2005 | Godfrey et al. |
| 6,961,574 B1 | 11/2005 | Stage et al. |
| 6,968,506 B2 | 11/2005 | Yacovone et al. |
| 6,990,455 B2 | 1/2006 | Vozick |
| 7,020,609 B2 | 3/2006 | Thrift et al. |
| 7,027,990 B2 | 4/2006 | Sussman |
| 7,036,128 B1 | 4/2006 | Julia et al. |
| 7,039,589 B2 | 5/2006 | Whitham |
| 7,047,196 B2 | 5/2006 | Calderone et al. |
| 7,065,188 B1 | 6/2006 | Mei et al. |
| 7,068,643 B1 | 6/2006 | Hammond |
| 7,092,738 B2 | 8/2006 | Creamer et al. |
| 7,100,118 B1 | 8/2006 | Klask |
| 7,130,391 B2 | 10/2006 | Janakiraman et al. |
| 7,136,480 B2 | 11/2006 | Mason |
| 7,139,591 B2 | 11/2006 | Callaghan et al. |
| 7,145,902 B2 | 12/2006 | Schindler et al. |
| 7,146,321 B2 | 12/2006 | Cyr et al. |
| 7,149,549 B1 | 12/2006 | Ortiz et al. |
| 7,159,008 B1 | 1/2007 | Wies et al. |
| 7,177,814 B2 | 2/2007 | Gong et al. |
| 7,180,889 B2 | 2/2007 | Kung et al. |
| 7,180,985 B2 | 2/2007 | Colson et al. |
| 7,181,401 B2 | 2/2007 | Johnson et al. |
| 7,181,502 B2 | 2/2007 | Incertis |
| 7,188,352 B2 | 3/2007 | Nathan et al. |
| 7,203,517 B2 | 4/2007 | Shimoda et al. |
| 7,206,745 B2 | 4/2007 | Surukkai et al. |
| 7,206,809 B2 | 4/2007 | Ludwig et al. |
| 7,209,124 B2 | 4/2007 | Hunt et al. |
| 7,213,061 B1 | 5/2007 | Hite et al |
| 7,215,743 B2 | 5/2007 | Creamer et al. |
| 7,216,348 B1 | 5/2007 | deCarmo |
| 7,225,409 B1 | 5/2007 | Schnarel et al. |
| 7,225,455 B2 | 5/2007 | Bennington et al. |
| 7,228,492 B1 | 6/2007 | Graham |
| 7,231,636 B1 | 6/2007 | Evans |
| 7,231,656 B1 | 6/2007 | Nathan |
| 7,240,006 B1 | 7/2007 | Brocious et al. |
| 7,240,289 B2 | 7/2007 | Naughton et al. |
| 7,246,063 B2 | 7/2007 | James et al. |
| 7,248,885 B2 | 7/2007 | Benco et al. |
| 7,250,939 B2 | 7/2007 | Lira |

(56) References Cited

U.S. PATENT DOCUMENTS

| | | |
|---|---|---|
| 7,254,227 B2 | 8/2007 | Mumick et al. |
| 7,265,861 B1 | 9/2007 | Ranalli et al. |
| 7,266,185 B2 | 9/2007 | Trandal et al. |
| 7,266,186 B1 | 9/2007 | Henderson |
| 7,266,499 B2 | 9/2007 | Surace et al. |
| 7,272,222 B2 | 9/2007 | Joseph et al. |
| 7,272,497 B2 | 9/2007 | Koshiji et al. |
| 7,277,854 B2 | 10/2007 | Bennett et al. |
| 7,280,097 B2 | 10/2007 | Chen et al. |
| 7,280,646 B2 | 10/2007 | Urban et al. |
| 7,280,651 B2 | 10/2007 | Anderson |
| 7,286,990 B1 | 10/2007 | Edmonds et al. |
| 7,289,608 B2 | 10/2007 | Kumhyr |
| 7,289,904 B2 | 10/2007 | Uyeki |
| 7,299,405 B1 | 11/2007 | Lee et al. |
| 7,303,121 B2 | 12/2007 | Martinez |
| 7,319,477 B2 | 1/2008 | Katz |
| 7,324,833 B2 | 1/2008 | White et al. |
| 7,324,947 B2 | 1/2008 | Jordan et al. |
| 7,328,239 B1 | 2/2008 | Berberian et al. |
| 7,330,890 B1 | 2/2008 | Partovi et al. |
| 7,353,016 B2 | 4/2008 | Roundtree et al. |
| 7,392,193 B2 | 6/2008 | Mault |
| 7,398,215 B2 | 7/2008 | Mesbah et al. |
| 7,406,413 B2 | 7/2008 | Geppert et al. |
| 7,412,533 B1 | 8/2008 | Johnson et al. |
| 7,433,452 B2 | 10/2008 | Taylor et al. |
| 7,440,898 B1 | 10/2008 | Eberle et al. |
| 7,450,112 B2 | 11/2008 | Shneidman |
| 7,466,803 B2 | 12/2008 | Burg et al. |
| 7,492,883 B2 | 2/2009 | Kumhyr |
| 7,539,484 B2 | 5/2009 | Roundtree |
| 7,546,143 B2 | 6/2009 | Nelson et al. |
| 7,584,249 B2 | 9/2009 | Mumick et al. |
| 7,606,741 B2 | 10/2009 | King et al. |
| 7,646,858 B2 | 1/2010 | Salafia et al. |
| 7,693,720 B2 | 4/2010 | Kennewick et al. |
| 7,720,091 B2 | 5/2010 | Faber et al. |
| 7,729,490 B2 | 6/2010 | Hemm et al. |
| 7,757,173 B2 | 7/2010 | Beaman |
| 7,809,376 B2 | 10/2010 | Letourneau et al. |
| 7,813,485 B2 | 10/2010 | Yin et al. |
| 7,843,899 B2 | 11/2010 | Burritt |
| 7,864,944 B2 | 1/2011 | Khouri et al. |
| 7,908,381 B2 | 3/2011 | Koch et al. |
| 7,966,188 B2 | 6/2011 | Ativanichayaphong et al. |
| 8,000,454 B1 | 8/2011 | Or-Bach et al. |
| 8,023,624 B2 | 9/2011 | Kargman et al. |
| 8,054,952 B1 | 11/2011 | Or-Bach et al. |
| 8,155,280 B1 | 4/2012 | Or-Bach et al. |
| 8,160,215 B2 | 4/2012 | Or-Bach et al. |
| 2002/0055844 A1 | 5/2002 | L'Esperance et al. |
| 2002/0147986 A1 | 10/2002 | Michael et al. |
| 2003/0005126 A1 | 1/2003 | Schwartz et al. |
| 2003/0007625 A1 | 1/2003 | Pines et al. |
| 2003/0033382 A1 | 2/2003 | Bogolea et al. |
| 2003/0074198 A1 | 4/2003 | Sussman |
| 2003/0112931 A1 | 6/2003 | Brown et al. |
| 2004/0034561 A1 | 2/2004 | Smith |
| 2004/0122941 A1 | 6/2004 | Creamer et al. |
| 2004/0198316 A1 | 10/2004 | Johnson |
| 2004/0204116 A1 | 10/2004 | Ben-Efraim et al. |
| 2005/0004977 A1 | 1/2005 | Roberts et al. |
| 2005/0055310 A1 | 3/2005 | Drewett et al. |
| 2006/0203977 A1 | 9/2006 | Erhart et al. |
| 2006/0239422 A1 | 10/2006 | Rinaldo et al. |
| 2006/0259424 A1 | 11/2006 | Turcotte et al. |
| 2006/0262921 A1 | 11/2006 | Eppel et al. |
| 2006/0285662 A1 | 12/2006 | Yin et al. |
| 2007/0026852 A1 | 2/2007 | Logan et al. |
| 2007/0032247 A1 | 2/2007 | Shaffer et al. |
| 2007/0038513 A1 | 2/2007 | Flax et al. |
| 2007/0094109 A1 | 4/2007 | Perry |
| 2007/0123223 A1 | 5/2007 | Letourneau et al. |
| 2007/0239537 A1 | 10/2007 | Protheroe et al. |
| 2007/0243887 A1 | 10/2007 | Bandhole et al. |
| 2007/0298776 A1 | 12/2007 | Arlene |
| 2008/0066015 A1 | 3/2008 | Blankenhorn |
| 2008/0095330 A1 | 4/2008 | Jin et al. |
| 2008/0226042 A1 | 9/2008 | Singh |
| 2008/0250334 A1 | 10/2008 | Price |
| 2009/0041215 A1 | 2/2009 | Schmitt et al. |
| 2009/0116414 A1 | 5/2009 | Or et al. |
| 2009/0136014 A1 | 5/2009 | Bigue et al. |
| 2009/0154666 A1 | 6/2009 | Rios et al. |
| 2009/0202050 A1 | 8/2009 | Berger et al. |
| 2009/0207980 A1 | 8/2009 | Berger et al. |
| 2009/0207996 A1 | 8/2009 | Berger et al. |
| 2009/0225788 A1 | 9/2009 | Kephart et al. |
| 2009/0228908 A1 | 9/2009 | Margis et al. |
| 2009/0276441 A1 | 11/2009 | Malik |
| 2009/0276708 A1 | 11/2009 | Smith et al. |
| 2009/0280863 A1 | 11/2009 | Shin et al. |
| 2009/0285380 A1 | 11/2009 | Chen et al. |
| 2010/0007028 A1 | 1/2010 | Fachmann et al. |
| 2010/0021030 A1 | 1/2010 | Collins et al. |
| 2010/0049654 A1 | 2/2010 | Pilo et al. |
| 2010/0087175 A1 | 4/2010 | Roundtree |
| 2010/0100377 A1 | 4/2010 | Madhavapeddi et al. |
| 2010/0166158 A1 | 7/2010 | Costello et al. |
| 2010/0172481 A1 | 7/2010 | Canu et al. |
| 2010/0189250 A1 | 7/2010 | Williams et al. |
| 2010/0191608 A1 | 7/2010 | Mikkelsen et al. |
| 2010/0216508 A1 | 8/2010 | Ma et al. |
| 2010/0330979 A1* | 12/2010 | Harris .......................... 455/420 |
| 2011/0009096 A1 | 1/2011 | Rotsztein et al. |
| 2011/0014952 A1 | 1/2011 | Minton |
| 2011/0060683 A1 | 3/2011 | Salmon Rock et al. |
| 2011/0091021 A1 | 4/2011 | Adkar et al. |
| 2011/0099116 A1 | 4/2011 | Gabel |
| 2011/0276408 A1 | 11/2011 | Toole |
| 2012/0063574 A1 | 3/2012 | Or-Bach et al. |

FOREIGN PATENT DOCUMENTS

| | | |
|---|---|---|
| EP | 1351477 A1 | 10/2003 |
| EP | 1120954 A3 | 6/2005 |
| EP | 1545101 A3 | 12/2005 |
| EP | 774853 B1 | 5/2006 |
| EP | 1874018 A1 | 1/2008 |
| JP | 2004274425 A | 9/2004 |
| WO | 9819259 A1 | 5/1998 |
| WO | 9840826 A3 | 12/1998 |
| WO | 9856158 A3 | 3/1999 |
| WO | 9848551 A3 | 4/1999 |
| WO | 0131497 A1 | 5/2001 |
| WO | 0157851 A1 | 8/2001 |
| WO | 0165871 A1 | 9/2001 |
| WO | 9820409 A8 | 11/2001 |
| WO | 0217604 A1 | 2/2002 |
| WO | 2004049306 A1 | 6/2004 |
| WO | 2004064299 A3 | 7/2005 |
| WO | 2007012831 A1 | 2/2007 |
| WO | 2007081929 A3 | 1/2008 |
| WO | 2008086320 A1 | 7/2008 |
| WO | WO 2008/086320 A1 | 7/2008 |
| WO | 2009006173 A3 | 3/2009 |
| WO | 2009100477 A1 | 8/2009 |

OTHER PUBLICATIONS

Damhuis, M., et al., "A Multimodal Consumer Information Server with IVR Menu," 2nd IEEE Workshop on Interactive Voice Technology for Telecommunications Applications (IVTTA94): pp. 73-76, Kyoto, Japan (Sep. 1994).

Shah, S.AA., et al., "Interactive Voice Response with Pattern Recognition Based on Artificial Neural Network Approach," International Conference on Emerging Technologies: pp. 249-252, (Nov. 2007).

Trihandoyo, A., et al., "A real-time speech recognition architecture for a multi-channel interactive voice response system," International Conference on Acoustics, Speech, and Signal Processing vol. 4: pp. 2687-2690,(1995).

(56) References Cited

OTHER PUBLICATIONS

Hattori, S., et al., "A multimedia intelligent message communication system for distributed coordination environments," Electronics & Communications in Japan, Part I—Communications, vol. 76, No. 1, pp. 11-23 (1993).
Patent abstracts of Japan, vol. 097, No. 001, Jan. 31, 1997 & JP 08 242307 A (Canon Inc), Sep. 17, 1996.
Kalva, H., et al., "Delivering Object-Based Audio-Visual Services," IEEE Transactions on Consumer Electronics, vol. 45, No. 4, pp. 1108-1111, (1999).
Schmandt, "Phoneshell: the telephone as computer terminal," Proceedings of first ACM International Conference on Multimedia, Anaheim, CA, US, pp. 373-381, (1993).
Himberg, J., et al., "Time Series Segmentation for Context Recognition in Mobile Devices", IEEE, 203-210, (2001).
Chris Schmandt and Stephen Casner, "Phonetool: Integrating Telephones and Workstations," IEEE Communication Society, Nov. 27-30, pp. 0970-0974, (1989).
Basinger, R. G., et al., "Calling Card Service—Overall Description and Operational Characteristics", The Bell System Technical Journal, (1982).
Cadiz et al. "Designing and Deploying an Information Awareness interface" CSCW'02, Nov. 2002, ACM, pp. 314-323.
Corcoran et al. disclose "User interface technologies for home appliances and networks", IEEE Trans. Consumer Elect; pp. 679-685, (1998).
Nancy Friedrich, "Graphical-User-Interface Module Eases Integration," Wireless Systems Design, Oct. 2004, 1 page.
Balachandran, R., et al., "Dialog System for Mixed Initiative One-Turn Address entry and Error Recovery," Proceedings of SIGDIAL 2009, the 10th Annual Meeting of the Special Interest Group in Discourse and Dialogue, pp. 152-155, Queen Mary University of London, Association of Computational Logistics, (2009).

\* cited by examiner

PORTABLE UNIVERSAL COMMUNICATION DEVICE

CROSS REFERENCE TO RELATED APPLICATIONS

This application is a Continuation-In-Part (CIP) of U.S. Non-Provisional application Ser. No. 12/699,618 entitled 'Systems and methods for visual presentation and selection of IVR menu' and filed on Feb. 3, 2010.

FIELD OF THE INVENTION

The invention relates to communication systems and more specifically the invention relates to devices and methods for enabling communication of a device with other devices.

BACKGROUND OF THE INVENTION

Various portable devices such as mobile phones are used for communication over the Internet and phone network. Further, such devices enable a user to view, read and write text, video, graphics and so forth by using their display screens. For example, the user can read and write messages, compose emails, and so forth. In recent years, the technology of the portable devices has improved tremendously. Various portable devices, such as smart phones include various hardware and software features that are generally present in personal computers. For example, various powerful mobile phone Operating Systems (OS) are available such as Windows Mobile, Apple iOS, Android, Symbian, Blackberry OS and so forth. Therefore, the devices provide all the essential functionalities for a day to day usage for the user. However, the devices have a drawback in terms of the size of the display screens. Generally, the form factor of the portable device is such that it is easier to carry and handle by the user. As a result, the size of the keypad and display screen is also limited, which makes the use of display difficult for the user. For example, the user may be required to zoom webpages to read them on the display screen of the portable device. Further, longer viewing on a small display screen may be stressful for the user. Moreover, the use of keypad may be uncomfortable for longer usage such as typing documents with hundreds of words.

A technique disclosed in U.S. Pat. No. 5,880,732 assigned to Telefonaktiebolaget L M Ericsson publ., enables transmission of numeric or text data from display of a mobile telephone to a larger screen of a remote display monitor. However, this technique does not mention transmission of graphics to the remote display monitor. As a result, the display of the mobile telephone cannot be replicated on the remote display monitor.

Another technique is discussed in U.S. Patent Application Publication No. 2010/0216508 assigned to Augusta Technology Inc. This technique discusses driving an external display device using a mobile phone device. The audio and video content on the mobile phone can be merged and displayed on an external device connected to the mobile phone device. However, the technique is limited to replicating and controlling the contents on the mobile device.

U.S. Pat. No. 6,228,921 discloses an external keyboard that can be connected to a mobile device. However, the functionality of the keyboard is limited to the mobile phone and cannot be used on other devices that are connected to the mobile device.

In light of the above discussion, techniques are desired for connecting and driving external devices from a portable device.

SUMMARY

Embodiments of the invention provide a portable device comprising at least one processor. The portable device also comprises a memory coupled to the processor comprising data. Further, the portable device comprises a detector configured to detect at least one external device. The at least one external device is configured to connect to the portable device. Further, the portable device comprises an interface to connect to the at least one external device. The interface is configured to transmit or receive one or more control signals excluding the data. Furthermore, the portable device comprises a controller configured to enable controlling of the portable device from the at least one external device; and controlling of the at least one external device from the portable device through the interface.

Embodiments of the invention provide a method for enabling communication among a plurality of devices. The method comprises detecting, at a portable device, at least one external device configured to connect to the portable device. The method also comprises connecting with the detected at least one external device. Further the method comprises transceiving one or more control signals excluding the data. Furthermore, the method comprises controlling at least one of the portable device from the at least one external device; and at least one external device from the portable device through the interface.

An aspect of the invention is to connect a user device with limited display capability with an external device comprising a large display screen via a portable device. For example connecting a mobile phone to a laptop computer.

Another aspect of the invention connects a portable device with an external device. The connected external device is configured to display content of a screen of the portable device at the external device.

BRIEF DESCRIPTION OF THE DRAWINGS

Figure 1:
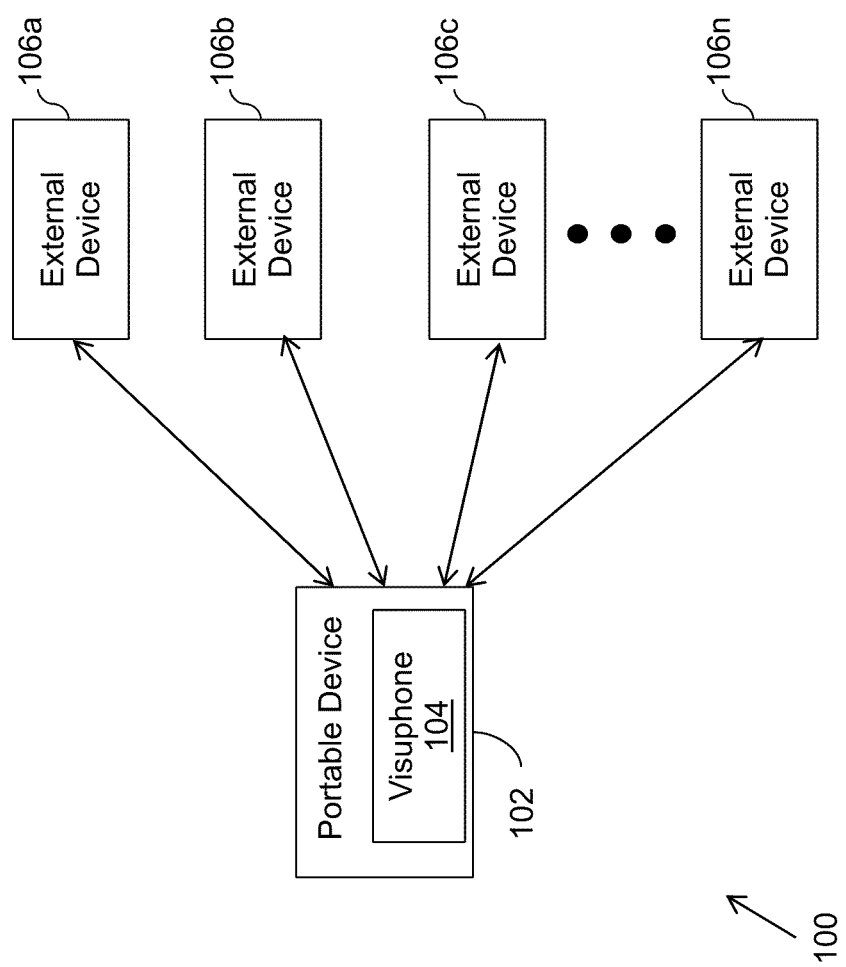
Figure 2:
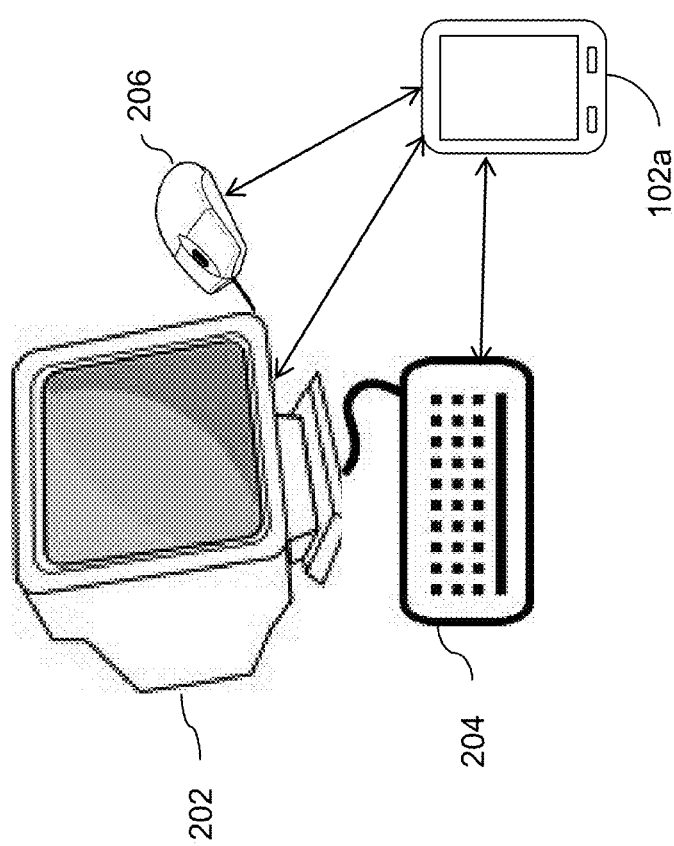
Figure 3:
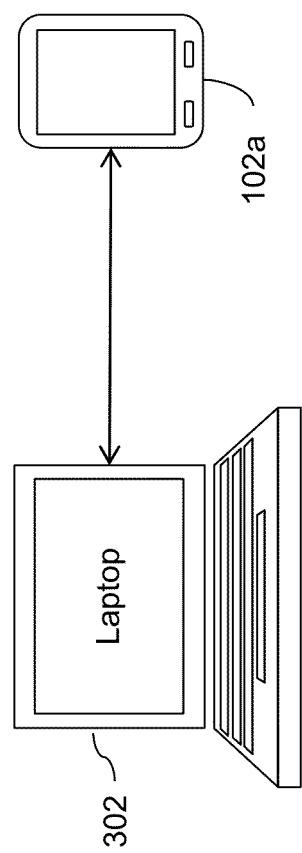
Figure 4:
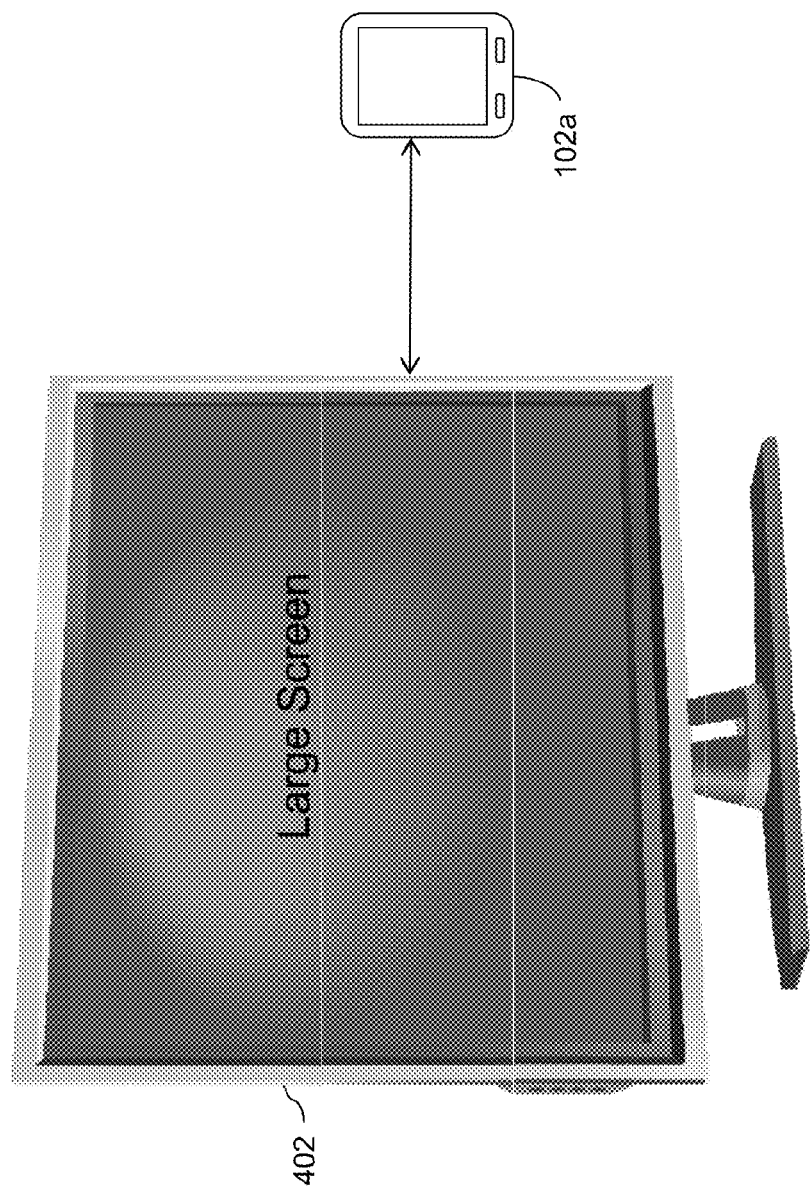
Figure 5:
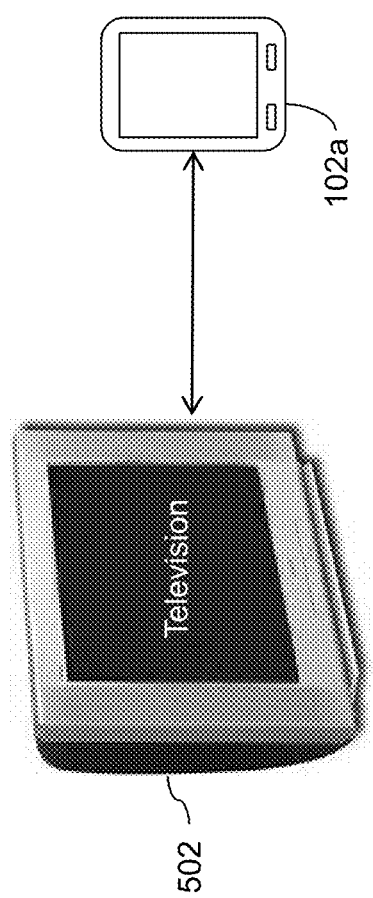
Figure 6:
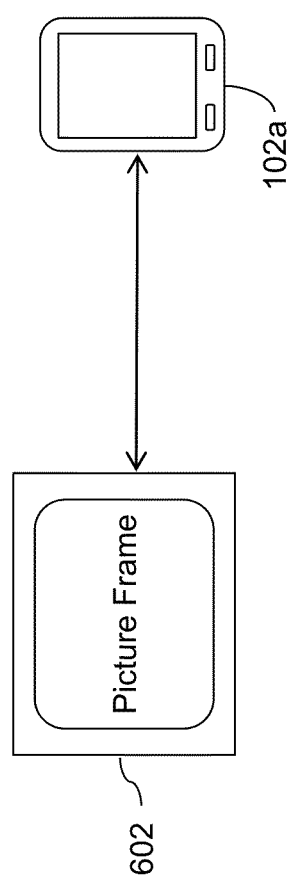
Figure 7:
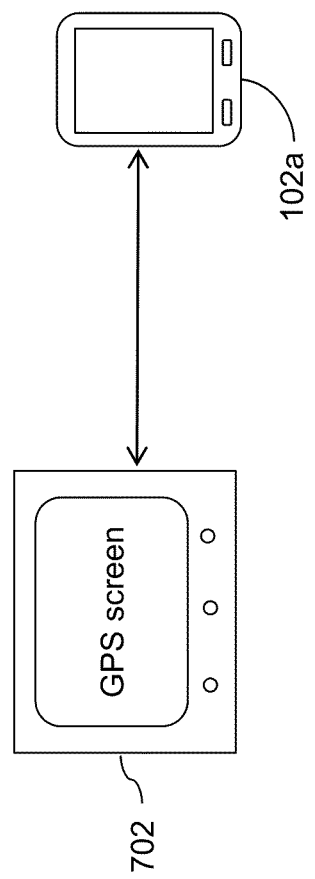
Figure 8:
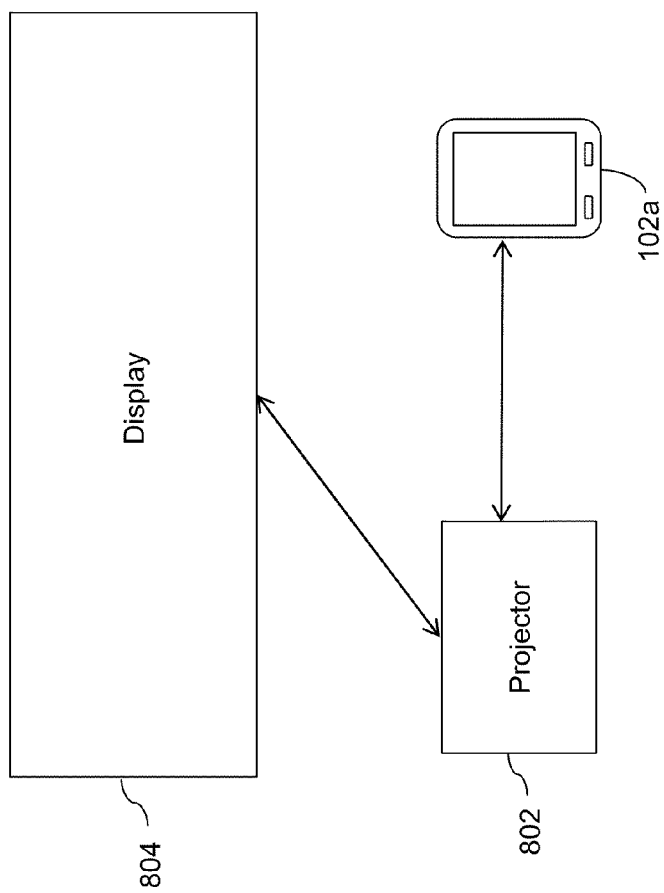
Figure 9:
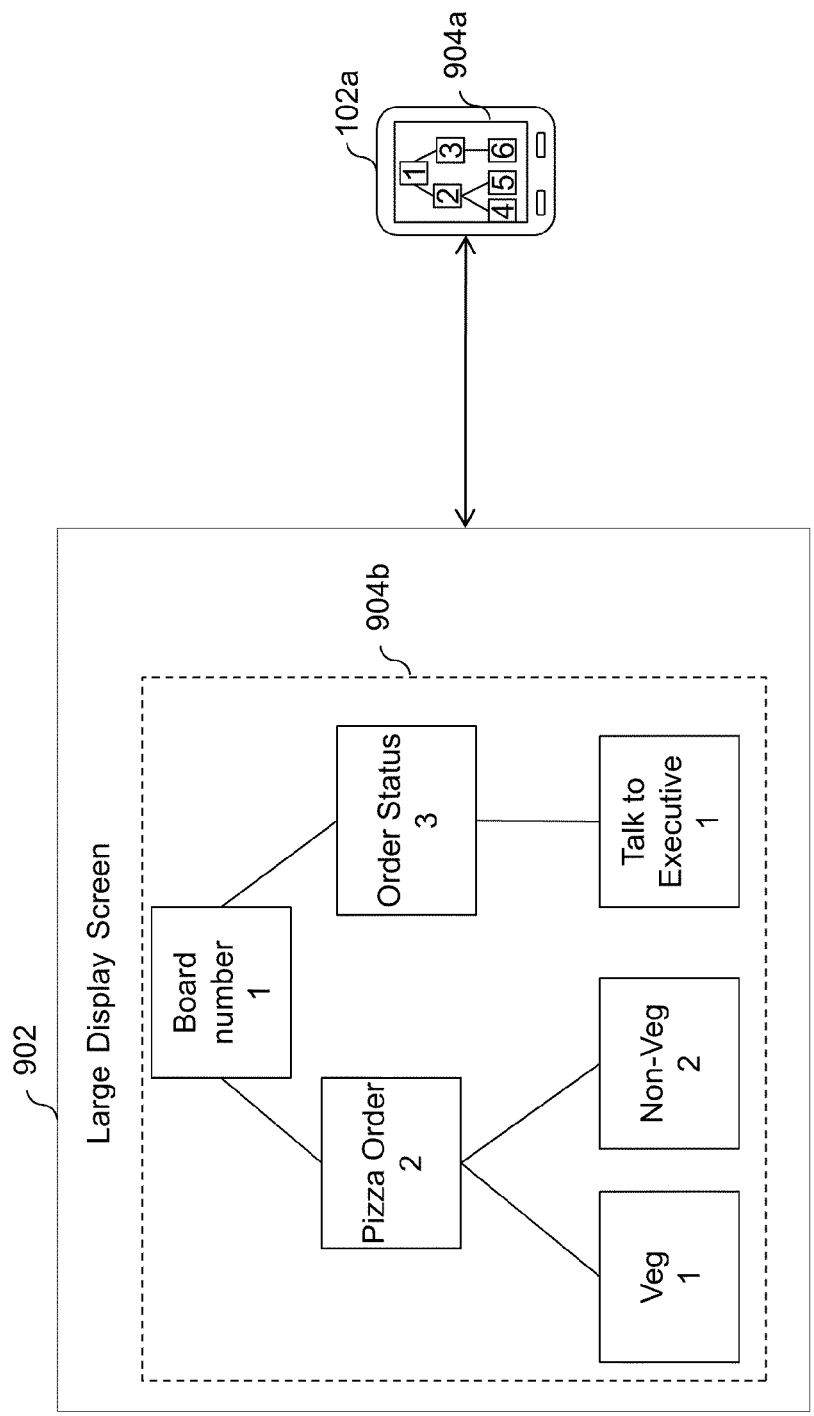
Figure 10:
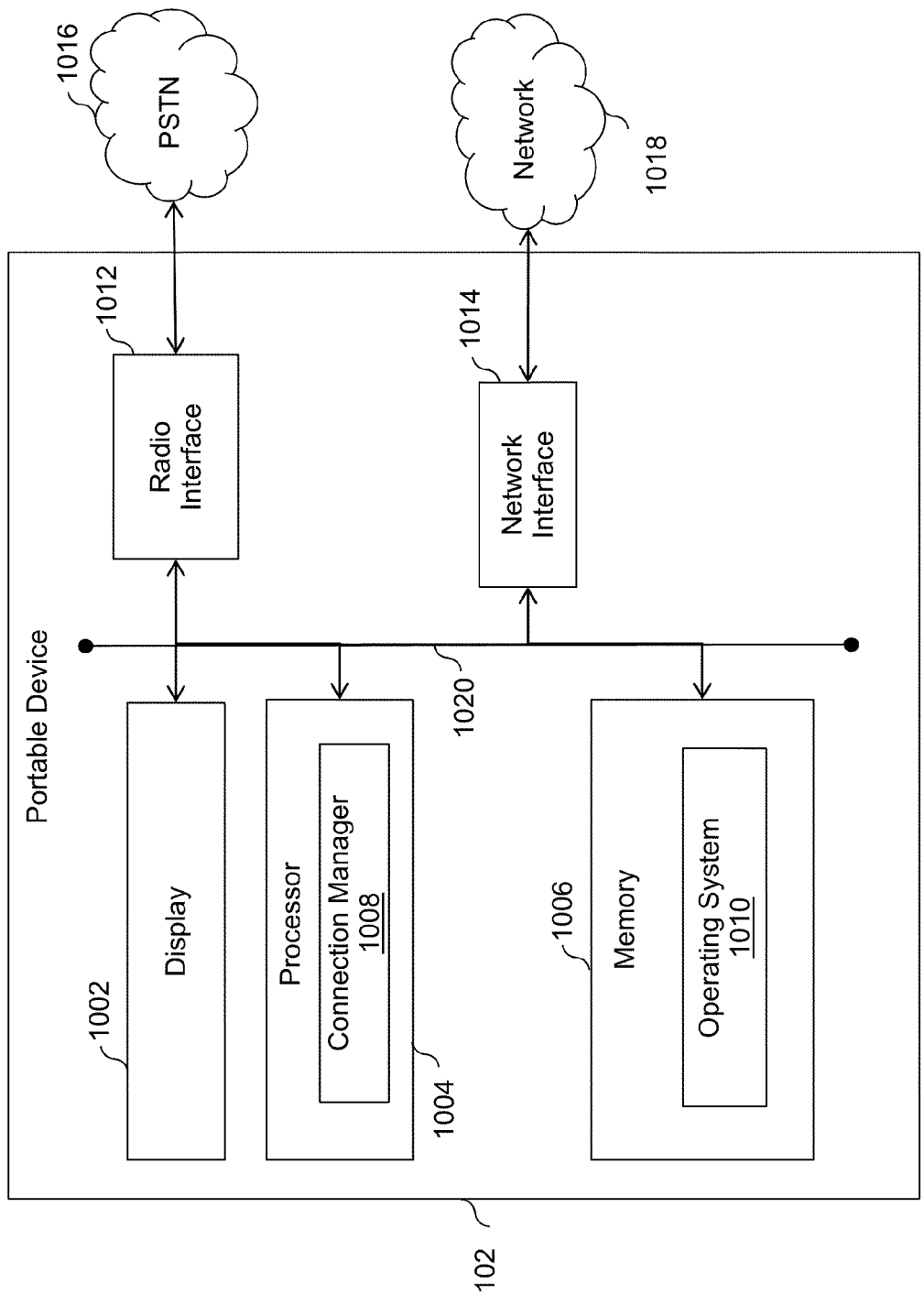
Figure 11:
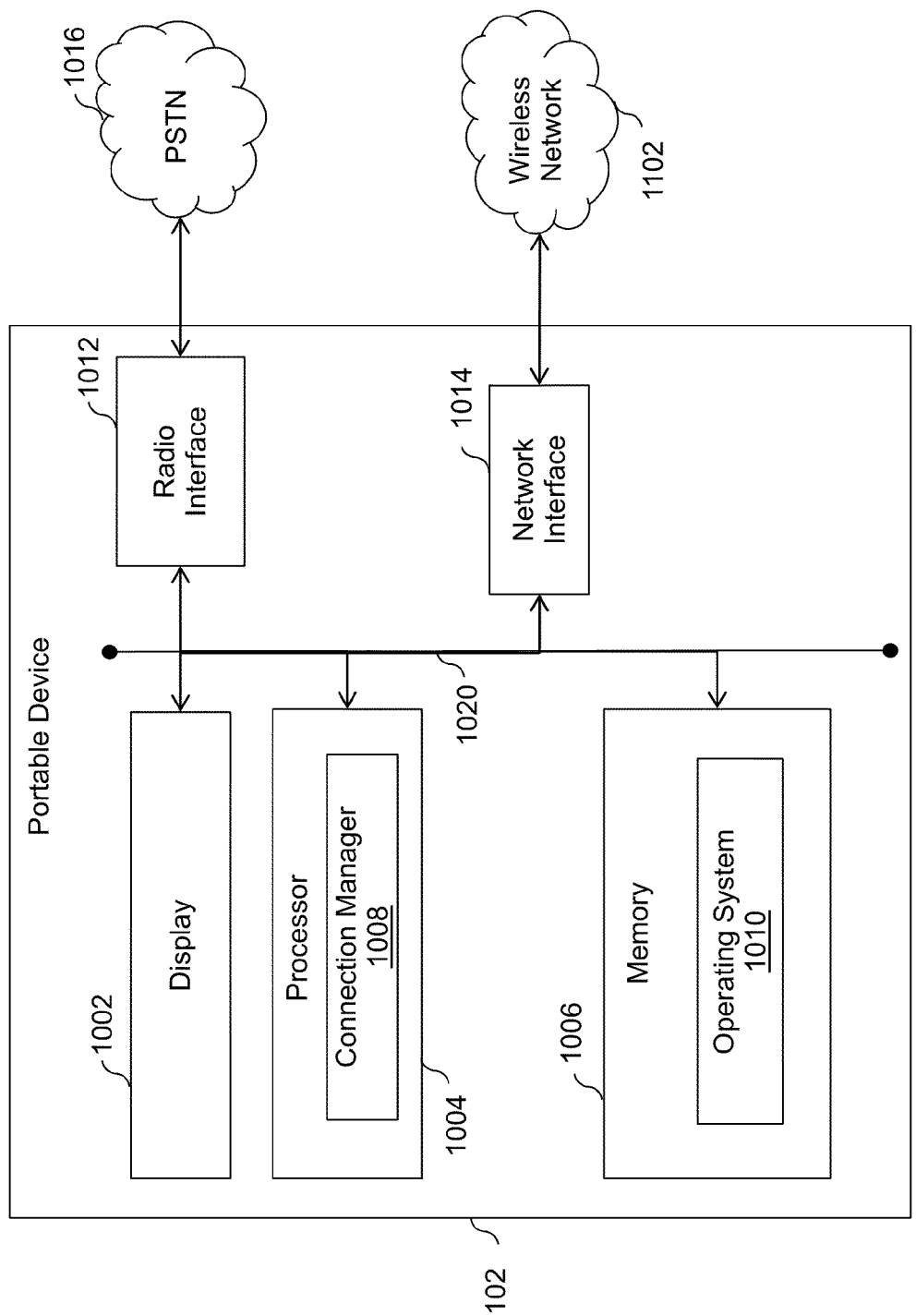
Figure 12:
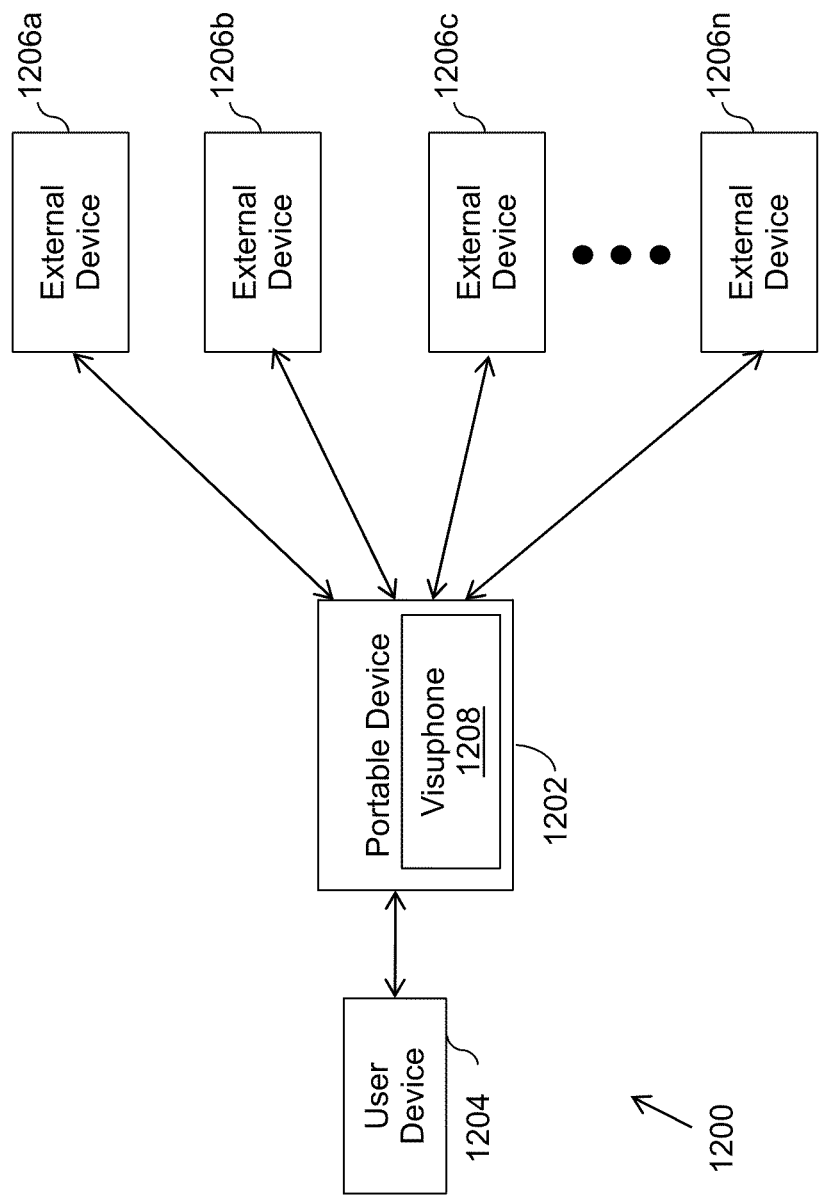
Figure 13:
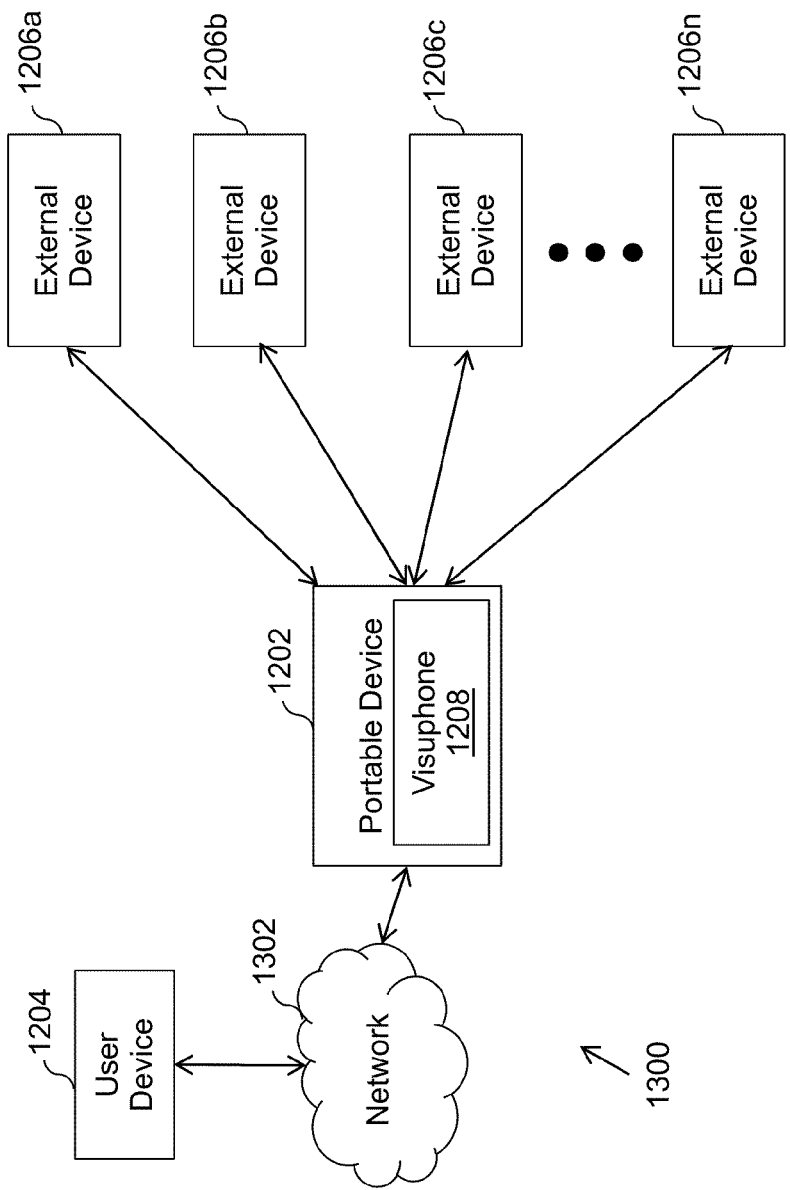
Figure 14:
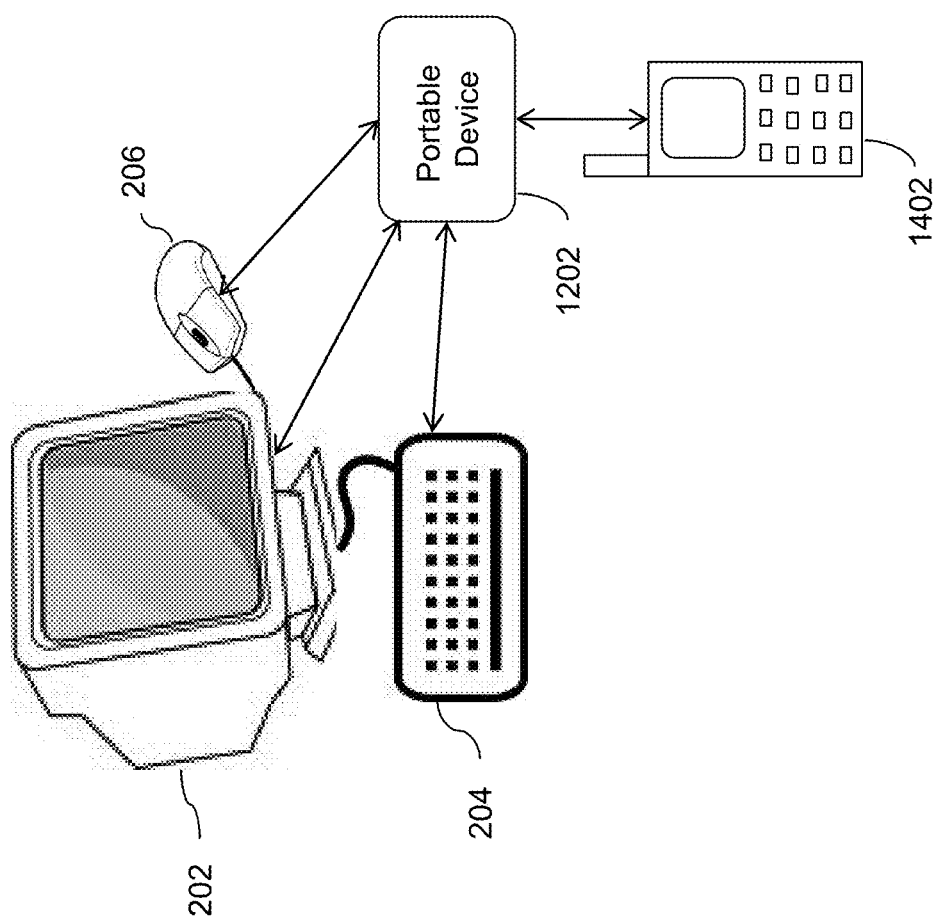
Figure 15:
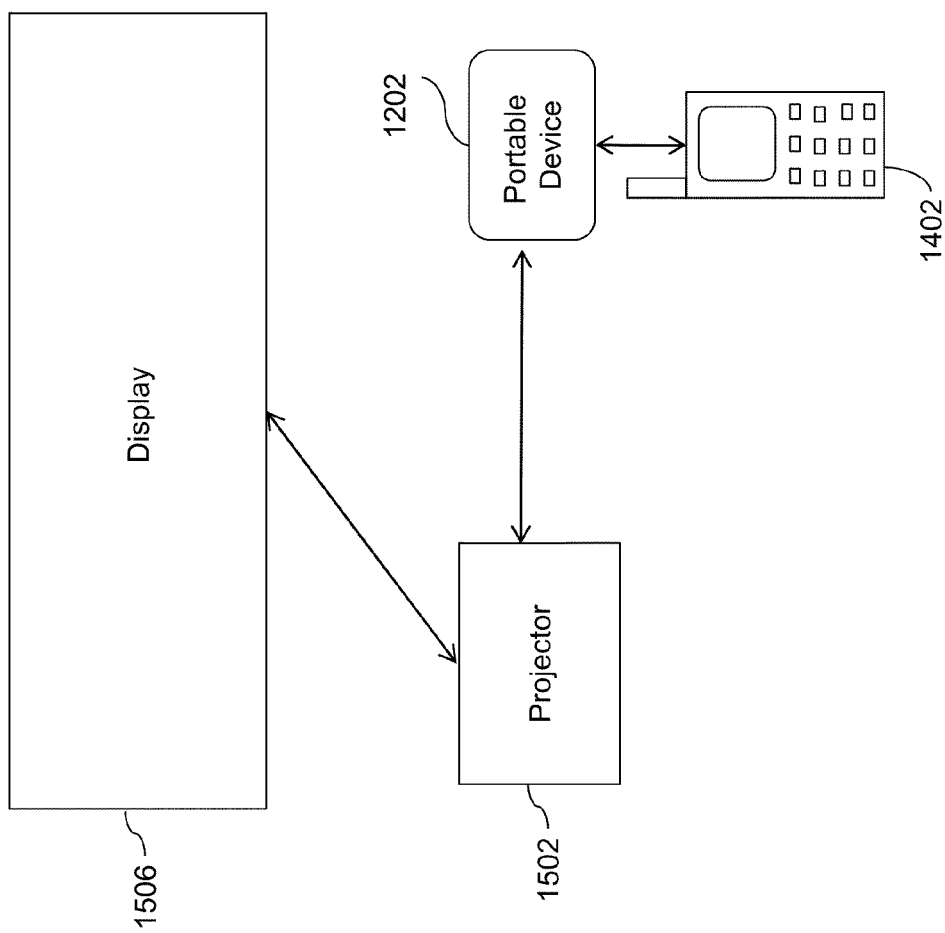
Figure 16:
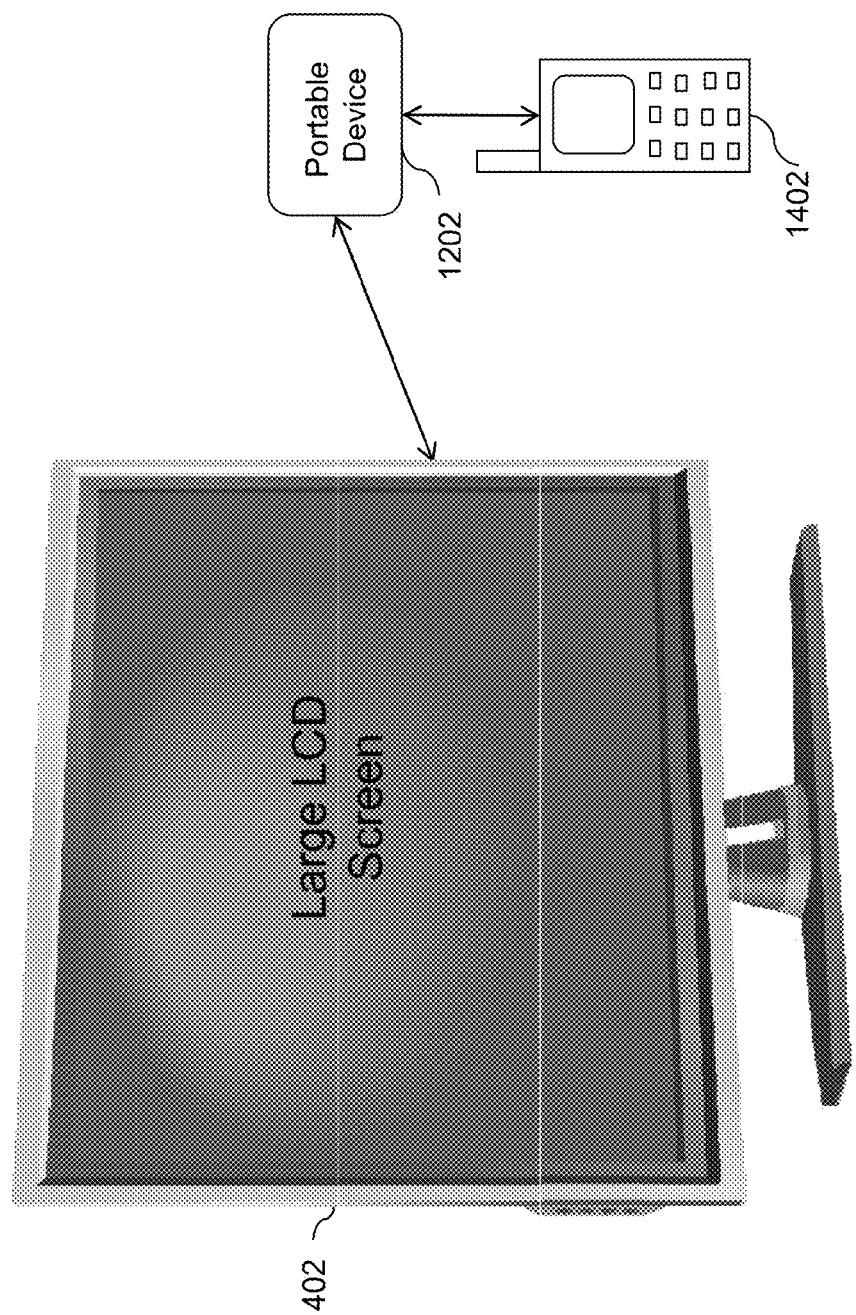
Figure 17:
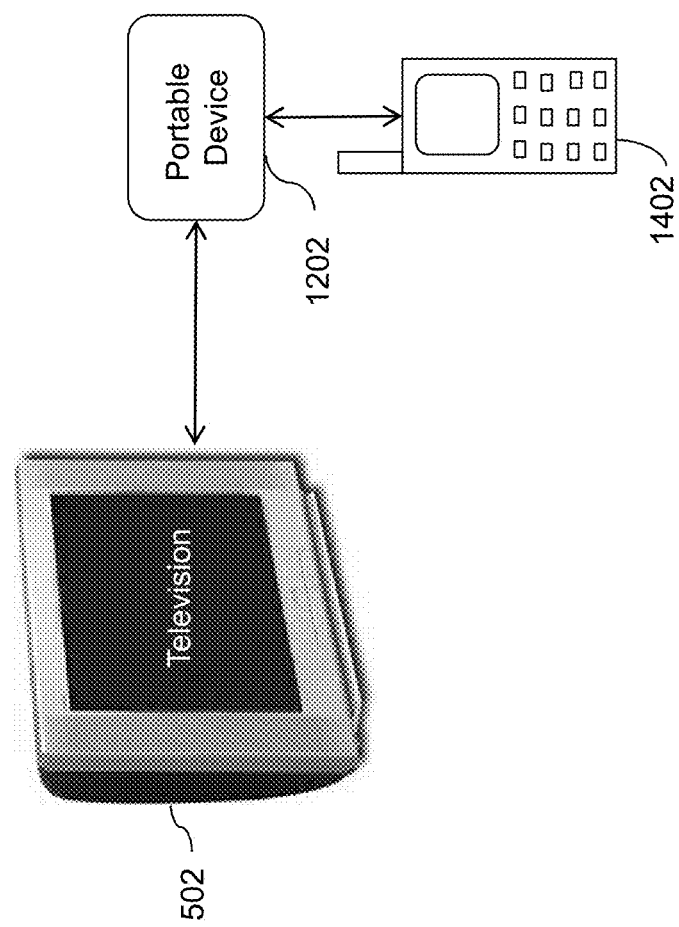
Figure 18:
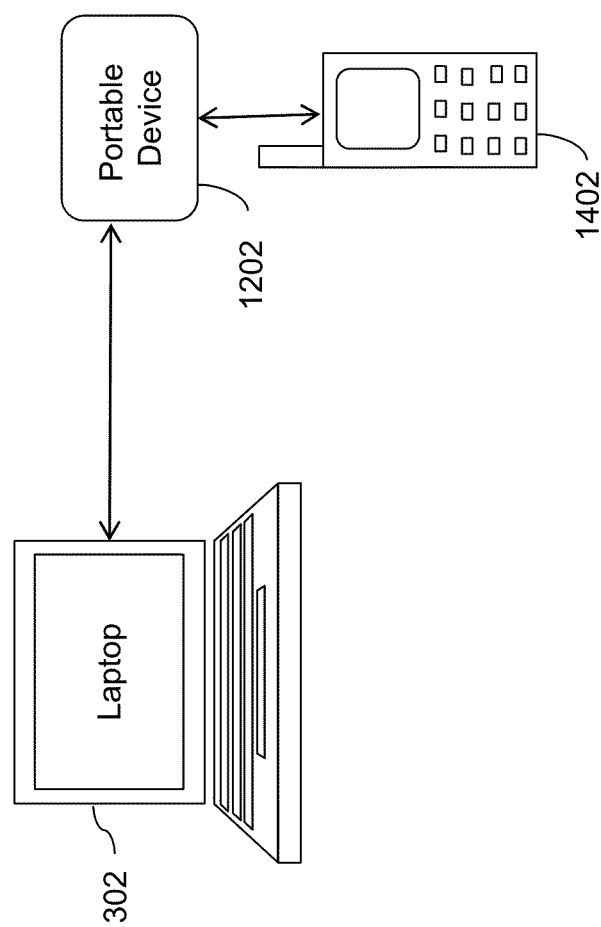
Figure 19:
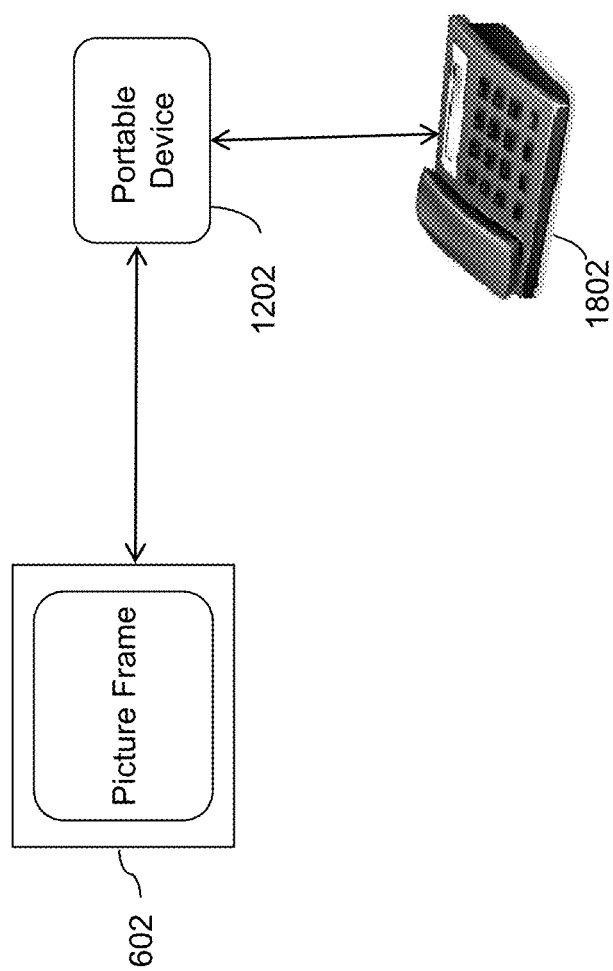
Figure 20:
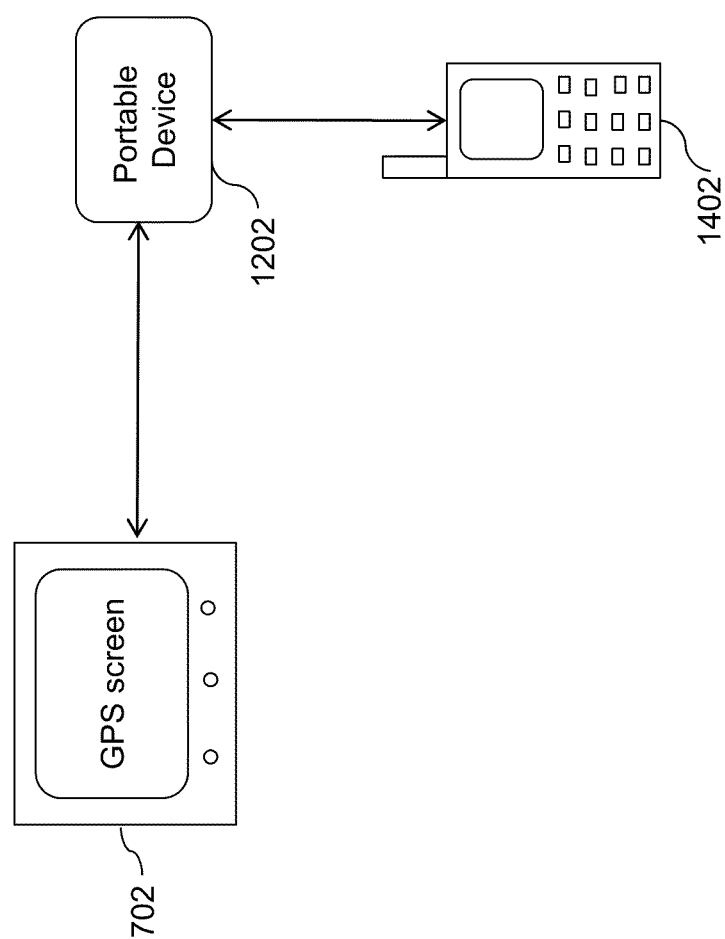

Having thus described the invention in general terms, reference will now be made to the accompanying drawings, which are not necessarily drawn to scale, and wherein:

FIG. 1 illustrates an environment where an embodiment of the invention may function;

FIG. 2 illustrates exemplary functioning of the portable device in the environment of FIG. 1, in accordance with an embodiment of the invention;

FIG. 3 illustrates exemplary functioning of the portable device such as a smart phone in the environment of FIG. 1, in accordance with an embodiment of the invention;

FIG. 4 illustrates exemplary functioning of the portable device such as the smart phone connected to a large display screen, in accordance with another embodiment of the invention;

FIG. 5 illustrates exemplary functioning of the portable device such as the smart phone connected to a television, in accordance with another embodiment of the invention;

FIG. 6 illustrates exemplary functioning of the portable device such as the smart phone connected to the picture frame, in accordance with another embodiment of the invention;

FIG. 7 illustrates exemplary functioning of the portable device such as the smart phone connected to a Global Positioning System (GPS) navigation system, in accordance with another embodiment of the invention;

FIG. 8 illustrates exemplary functioning of the portable device such as the smart phone connected to a projector, in accordance with yet another embodiment of the invention;

FIG. 9 illustrates exemplary display of an Interactive Visual Response (IVR) menu on a large display screen connected to a portable device such as the smart phone, in accordance with an embodiment of the invention;

FIG. 10 illustrates block diagram of the portable device, in accordance with an embodiment of the invention;

FIG. 11 illustrates block diagram of the portable device, in accordance with another embodiment of the invention function;

FIG. 12 illustrates another environment where various embodiments of the invention may function;

FIG. 13 illustrates yet another environment where various embodiments of the invention may function;

FIG. 14 illustrates exemplary functioning of the portable device connected to a mobile phone and a computer in the environment of FIG. 12 or FIG. 13, in accordance with an embodiment of the invention FIG. 15 illustrates exemplary functioning of the portable device connected to a mobile phone and a projector in the environment of FIG. 12 or FIG. 13, in accordance with another embodiment of the invention;

FIG. 16 illustrates exemplary functioning of the portable device connected to a mobile phone and large screen in the environment of FIG. 12 or FIG. 13, in accordance with another embodiment of the invention;

FIG. 17 illustrates exemplary functioning of the portable device connected to a mobile phone and a television in the environment of FIG. 12 or FIG. 13, in accordance with another embodiment of the invention;

FIG. 18 illustrates exemplary functioning of the portable device connected to a mobile phone and a laptop in the environment of FIG. 12 or FIG. 13, in accordance with another embodiment of the invention;

FIG. 19 illustrates exemplary functioning of the portable device connected to a landline phone and a telephone in the environment of FIG. 12 or FIG. 13, in accordance with another embodiment of the invention;

FIG. 20 illustrates exemplary functioning of the portable device connected to a mobile phone and a GPS navigation system, in accordance with an embodiment of the invention.

Figure 21:
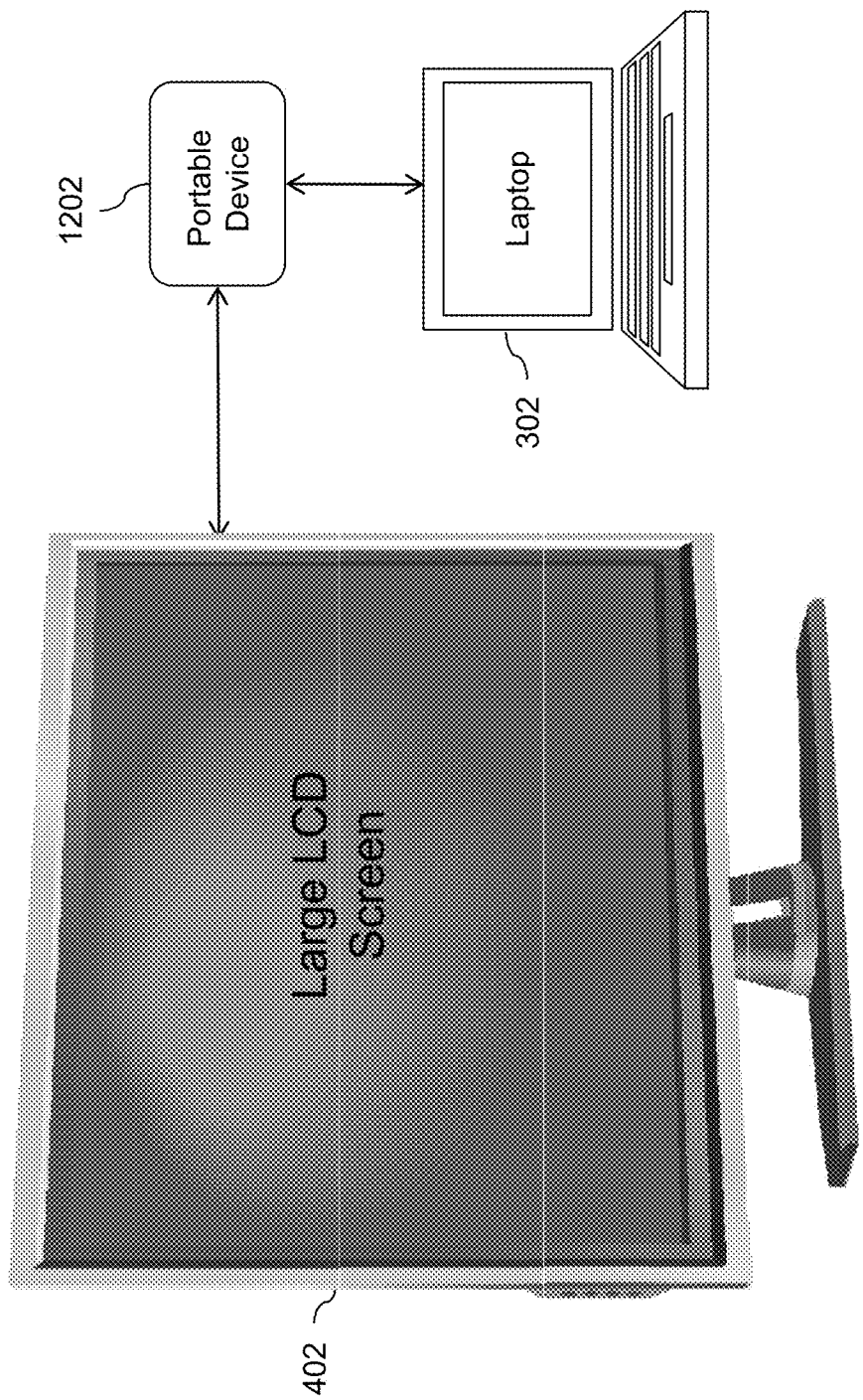

FIG. 21 illustrates an exemplary functioning of portable device connected to a large screen and laptop, in accordance with an embodiment of the invention.

Figure 22:
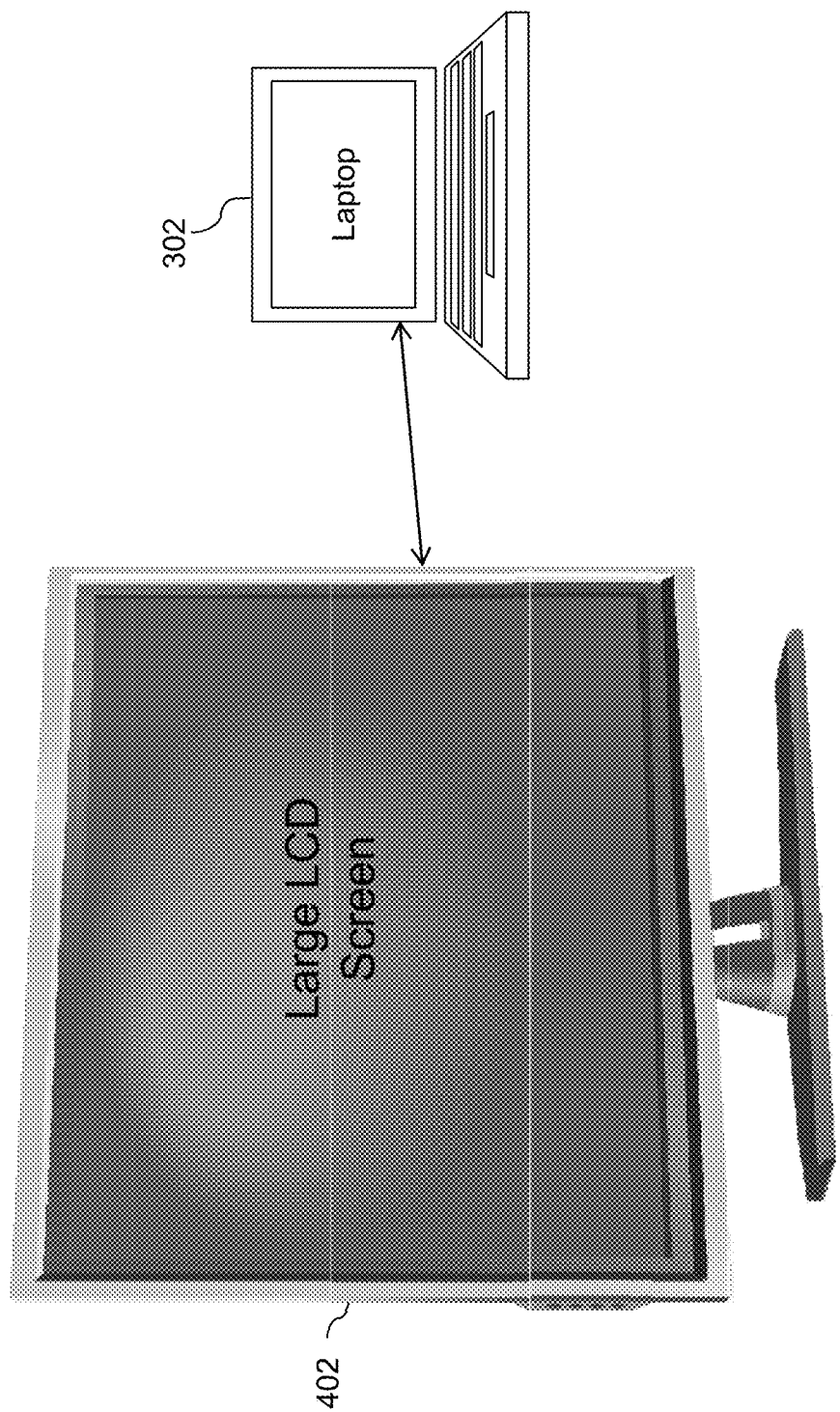

FIG. 22 illustrates an exemplary functioning of portable device such as laptop connected to a large screen, in accordance with an exemplary embodiment of the invention.

Figure 23:
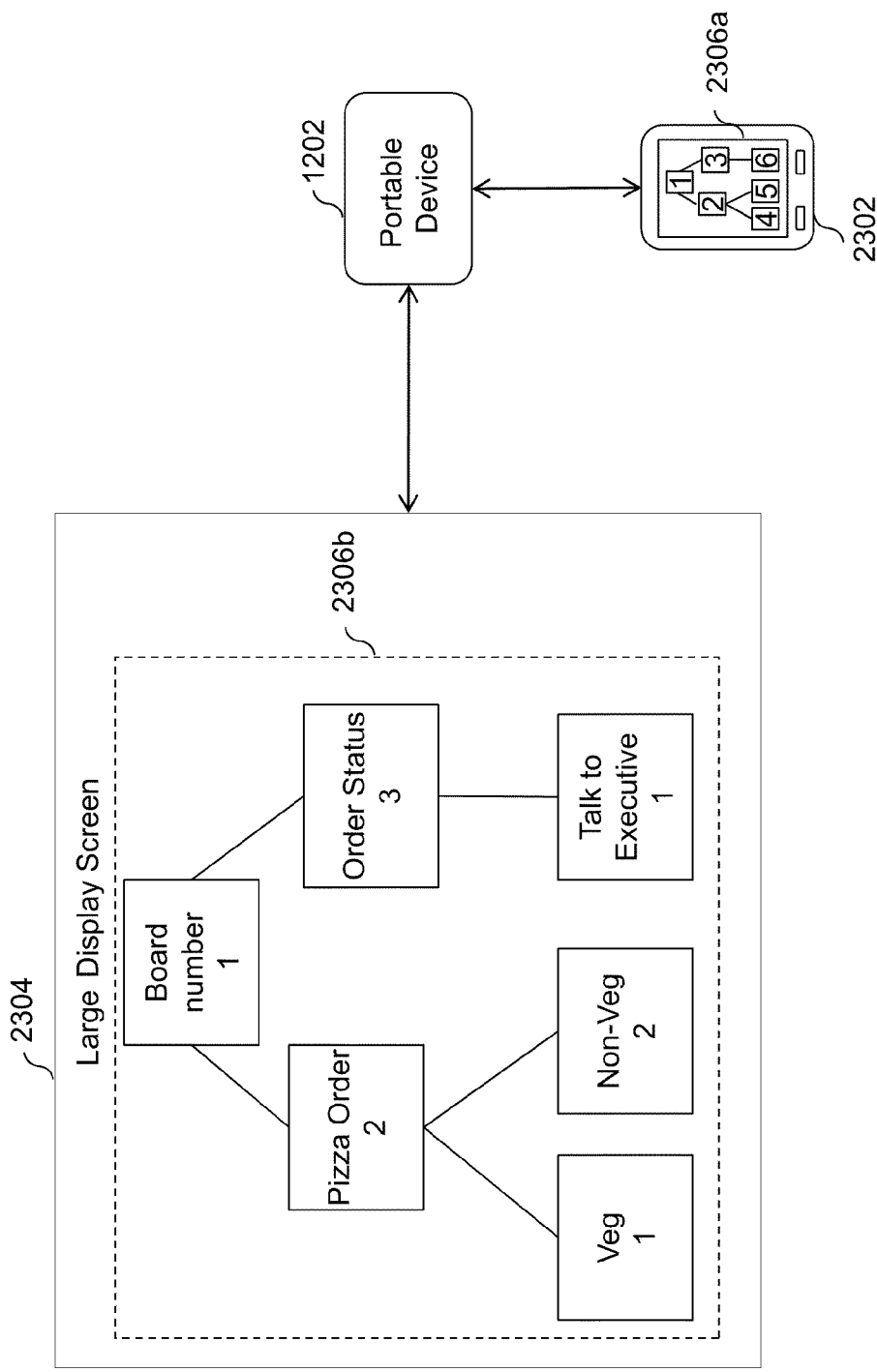
Figure 24:
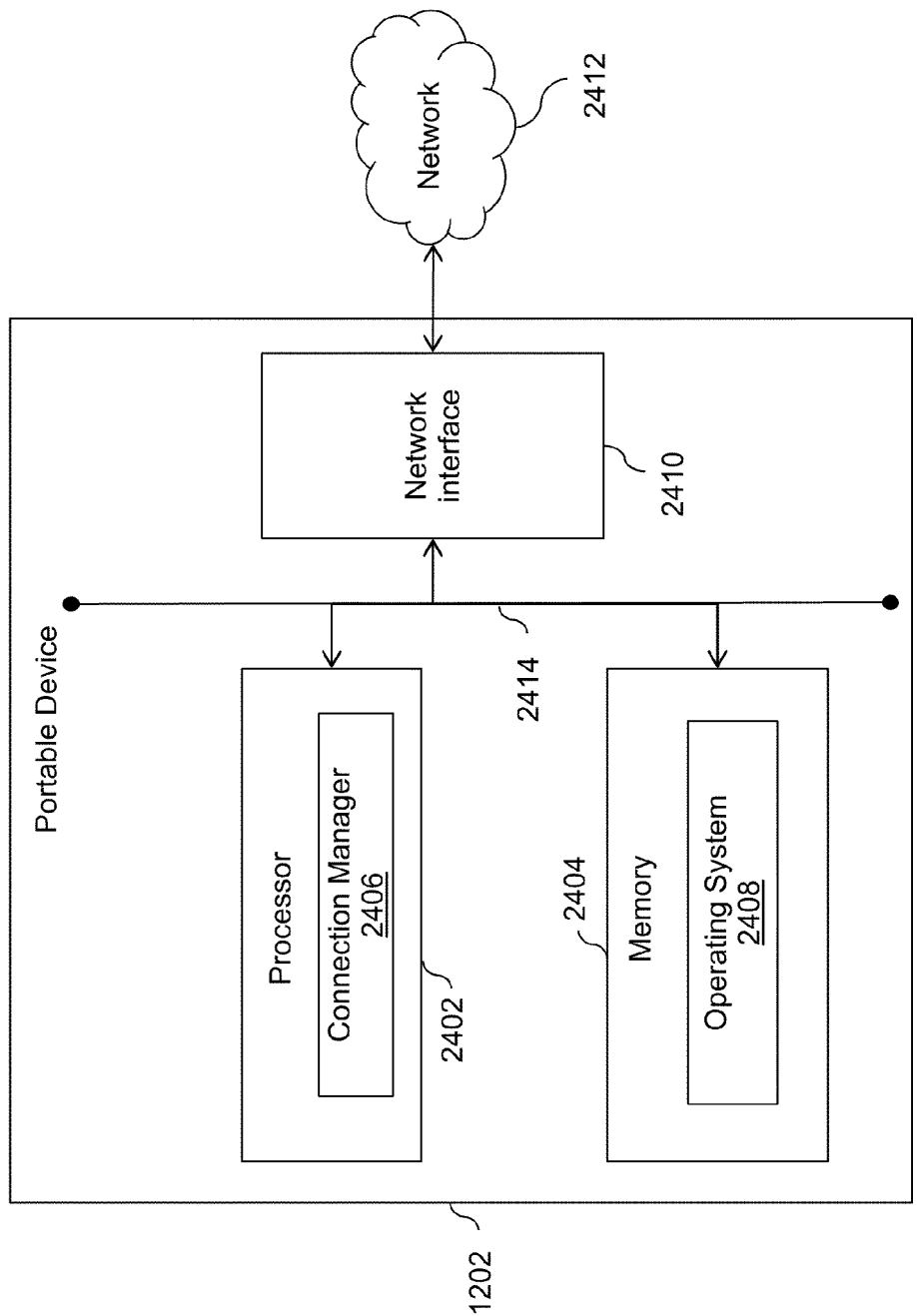
Figure 25:
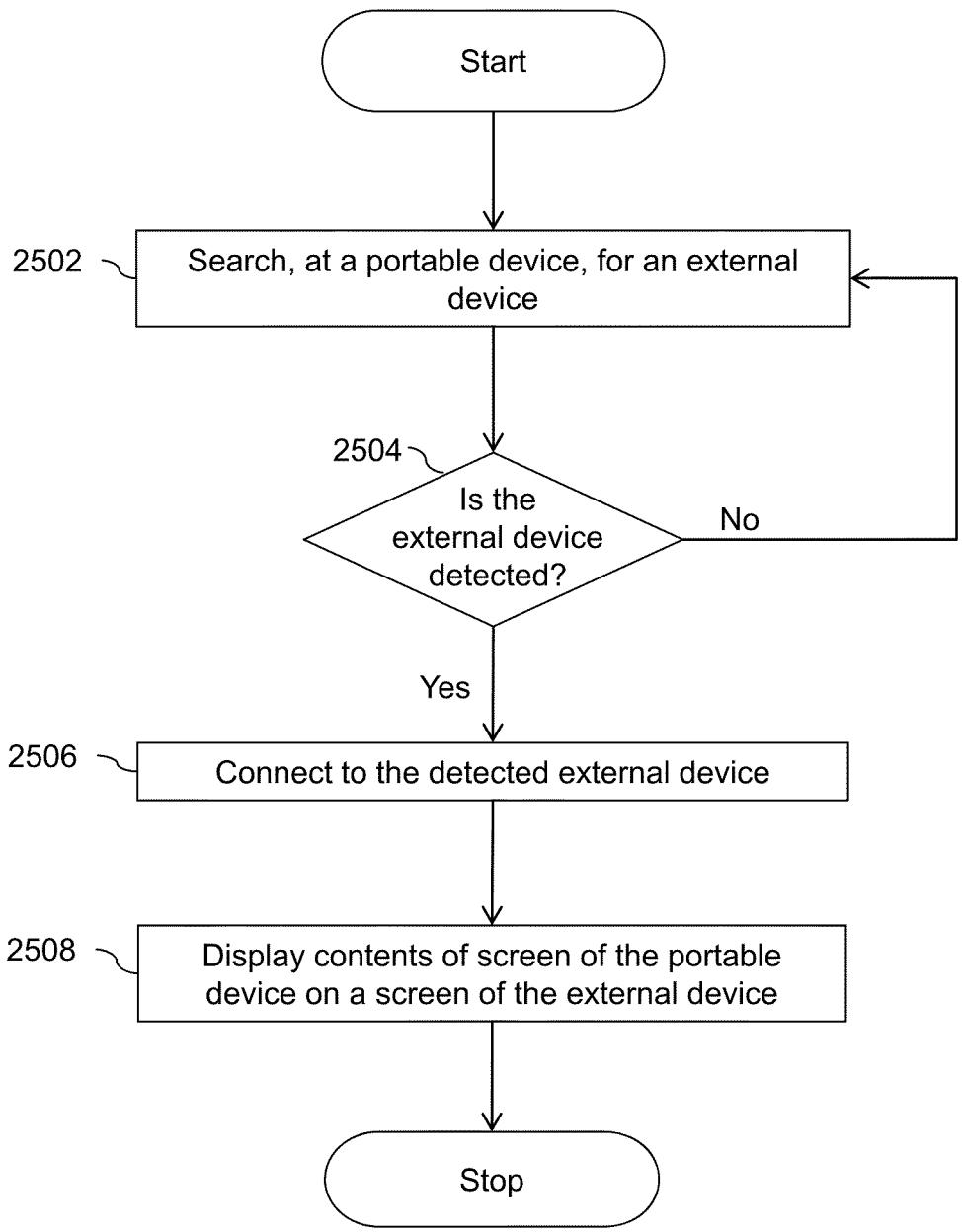
Figure 26A:
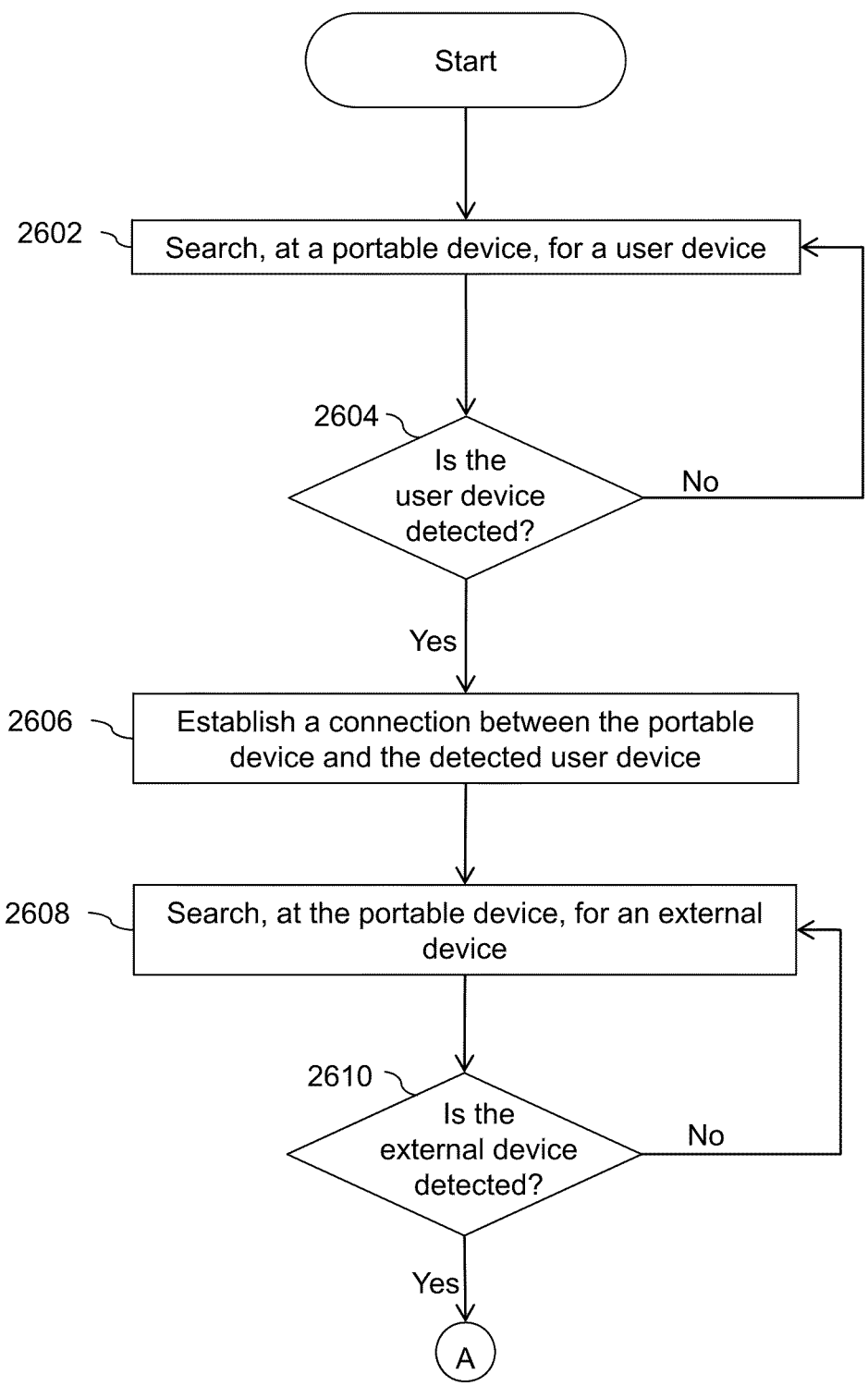
Figure 26B:
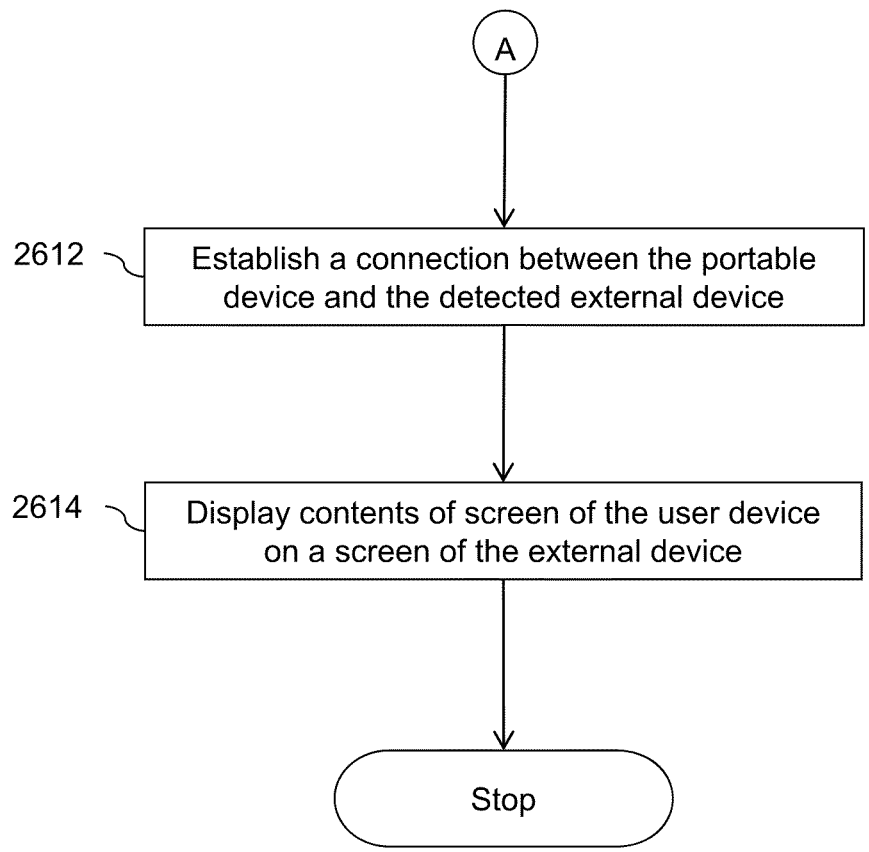

FIG. 23 illustrates an exemplary display of a visual Interactive Visual Response (IVR) menu on a large display screen connected to a portable device such as the smart phone, in accordance with an embodiment of the invention;

FIG. 24 illustrates a block diagram of the portable device, in accordance with the another embodiment of the invention;

FIG. 25 is a flow diagram illustrating the functioning of portable device 102 in accordance with an embodiment of the invention; and FIGS. 26A and 26B is a flow diagram illustrating the functioning of portable device 102 in accordance with another embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates an environment 100 where various embodiment of the invention can function. As shown, environment 100 includes a portable device 102 that can be used by a user. Examples of portable device 102 include but are not limited to a mobile phone, a smart phone, a Personal Desktop Assistant (PDA), a tablet Personal Computer (PC), and so forth. Portable device 102 may be used for communication such as data and voice communications over a Public Switched Telephone Network (PSTN), mobile network, the Internet, the Ethernet, and so forth. In an embodiment of the invention, portable device 102 may include an Operating System (OS) such as, but not limited to, Windows Mobile, Apple iOS, Google Android, Symbian, and so forth. Portable device 102 is further configured to detect and connect to a plurality of external devices 106a-n. Portable device 102 may be connected to the plurality of external devices 106a-n. Examples of external devices 106a-n include, but are not limited to, a display screen, a keyboard, a mouse, and so forth.

Portable device 102 may connect to external devices 106a-n by using Bluetooth, Wi-Fi, Infrared, or other wireless protocols. In an embodiment, portable device 102 may include a detector for detecting at least one external device of external devices 106a-n. The detector may be hardware, an application stored as software, a firmware on portable device 102, or a combination thereof. In another embodiment of the invention, portable device 102 may include an interface to connect to the at least one external device. The interface is also configured to transmit or receive one or more control signals excluding the data. In an embodiment, the interface can be hardware such as a Universal Serial Bus (USB) docket or a software application such as a user interface.

Further, portable device 102 may connect to external devices 106a-n by using an Ethernet cable, a video cable, Universal Serial Bus (USB), and so forth. After establishing a connection between portable device 102 and external device 106a, the display on the screen of portable device 102 can be presented on external device 106a such as a display screen. Moreover, external device 106b such as a mouse connected to portable device 102, can be used to provide inputs that are reflected on the display screen of the connected external device 106. As a result, portable device 102 acts as a universal communication hub that can enable interaction of multiple external device 106a-n among each other.

Portable device 102 is further configured to transmit to or receive one or more control signals excluding data. In an embodiment, the control signals are received from at least one external device of the plurality of external devices 106a-n connected to portable device 102. In an embodiment, the one or more control signals are signals for controlling mouse events. In another embodiment of the invention, the one or more control signals are signals for controlling one or more key presses at a keypad. In yet another embodiment, the one or more control signals are the signals for displaying content at the at least one external device. The content is not stored at the at least one external device. In another embodiment of the invention, the one or more control signals are the signals for displaying content of portable device 102. The displayed content is stored at portable device 102 and not transferred or stored at the at least one external device. In an embodiment, portable device may include a controller configured to enable controlling of portable device 102 from the at least one external device (connected external device); and controlling of the at least one external device from portable device 102 through the interface. The controller may be hardware, an application stored as software, a firmware on portable device 102, or a combination thereof.

Further, portable device 102 includes a Visuphone 104 configured to display a visual Interactive Voice Response (IVR) menu at screen of portable device 102. Further, portable device 102 stores a plurality of visual IVR menus corresponding to one or more phone numbers associated with the dialed destination or calling parties. When a call is received at portable device 102, Visuphone 104 can search for a visual IVR menu corresponding to the received phone number in a database at portable device 102. Thereafter, Visuphone 104 can display the visual IVR menu at the screen of portable device 102.

FIG. 2 illustrates exemplary functioning of portable device 102 such as a portable device 102a in the environment discussed in conjunction with FIG. 1, in accordance with an embodiment of the invention. As shown, a display screen 202, a keyboard 204, and a mouse 206 can be connected through portable device 102a. Therefore, the screen of portable device 102a such as a smart phone is displayed on a larger screen of display screen 202. Moreover, a user can use keyboard 204 and mouse 206 to access the information through portable device 102a. For example, in this configuration, the user can browse the Internet by using display screen 202, keyboard 204, and mouse 206, while portable device 102a provides the Internet connectivity. Therefore, a computer other than portable device 102a may not be required by the user. As a result, the user can carry portable device 102a and use it with various external devices 106a-n as desired. In an embodiment of the invention, display screen 202 includes a television screen. In this case, the television screen may be used to display the screen of the mobile device. Therefore, when the user can use the television screen to access various functions of portable device 102a such as, but not limited to, call receiving, dialing, browsing the phonebook, typing a message, browsing the Internet and so forth. This functionality increases the comfort in using the small form factor of portable device 102a.

In an embodiment of the invention, portable device 102a such as a smart phone or mobile phone may detect and connect to a laptop 302 as shown in FIG. 3. The connection between portable device 102a (smart phone) and laptop 302 may be wired such as via a USB wire or it can be wireless such as via Bluetooth, Wi-Fi, or any other wireless connection. Thereafter, portable device 102a may use display of laptop 302. Further, laptop 302 may be used to control one or more functions of portable device 102a and vice versa. For example, user can use one or more keys of laptop 302 may be used to access phone book of the smart phone or to dial a phone number.

In an embodiment, portable device 102a i.e. smart phone may include a detector for detecting laptop 302. The detector may be hardware, an application stored as software, a firmware on portable device 102, or a combination thereof. Further, smart phone may include an interface to connect to laptop 302. The interface may also be configured to transmit or receive one or more control signals excluding the data. In an embodiment, the interface can be hardware such as a Universal Serial Bus (USB) docket or a software application. Further, smart phone may include a controller which is configured to enable controlling of smart phone from the at least one external device such as laptop 302; and controlling of the at least one external device i.e. laptop 302 from portable device through the interface. The controller may be hardware, an application stored as software, a firmware on portable device 102, or a combination thereof.

In an embodiment, the connected external devices 106a-n may be used for displaying the content of the portable device 102, but the connected external devices may not store the content. The storage of content will always remain on the portable device 102 or 102a only. For example, the user is accessing the Internet from an Internet café. If the user wants to send a picture stored in the mobile phone through an e-mail. Then, the mobile phone can directly connect to computer or computer peripherals of the cafe. Thereafter, the user can search and select the picture stored at the mobile phone by using the computer screen and mouse or keyboard and can attach in the e-mail. Further, for mailing the picture stored at the mobile phone, the picture is not transferred from the mobile phone to the internet café's computer. The picture can be attached directly from the mobile phone's memory and can be mailed by using the computer connected to the mobile phone. While transferring and mailing the picture, the picture is not stored at the computer of internet café. Hence, this way the picture from the mobile phone can be mailed by using the computer of the café without actually storing or transferring the picture to the computer. This feature of the portable device enhances security as the content from the portable device is never transferred or stored on the computer of café.

FIG. 4 illustrates an exemplary functioning of portable device 102a such as a smart phone connected to an external device such as a large display screen 402, in accordance with another embodiment of the invention. Further, portable device 102a may use Bluetooth, USB wire, and so forth to connect to large screen 402. The large screen 402 may be a Light Emitting Diode (LED) display screen, a Liquid Crystal Display (LCD) screen, and so forth. Usually, portable devices such as mobile phones, smart phones, wired telephones etc. have either a small display or limited display capabilities. In an embodiment, portable device 102a may include a Visuphone. Visuphone 104 may be further configured display a visual IVR menu at portable device 102a. Portable device 102a is configured to detect and connect to one or more external devices such as large screen 402. Once configured, portable device 102a can detect large display 402 and can connect to it via Bluetooth or a wired connection. In an embodiment, portable device 102a i.e. smart phone may include a detector for detecting large screen 402. The detector may be hardware, an application stored as software, a firmware on portable device 102, or a combination thereof. Further, smart phone may include an interface to connect to large screen 402. The interface may be configured to transmit or receive one or more control signals excluding the data. In an embodiment, the interface can be hardware such as a Universal Serial Bus (USB) docket or a software application. In an embodiment, portable device 102a may connect to external devices 106a-n using Near Field Communication (NFC) protocol. Further, when portable device 102a is video conferencing with another portable device, the video can be displayed at large screen 402. For example, when the smart phone is in video call with another phone, the video of the user at another phone will be displayed at large screen 402.

Further, smart phone may include a controller which is configured to enable controlling of smart phone from large screen 402; and controlling of large screen 402 from portable device 102a through the interface. The controller may be hardware, an application stored as software, a firmware on portable device 102, or a combination thereof.

FIG. 5 illustrates functioning of portable device 102a connected to an external device such as a television 502, in accordance with an embodiment of the invention. Visuphone 104 is configured to display an Interactive Voice Response (IVR) menu of a phone number associated with a dialed destination or a calling party at portable device 102a. In an embodiment, portable device 102a is configured to detect and connect to external devices 106a-n such as television 502. After connecting to television 502, screen of television 502 may be used to display the screen of portable device 102a. Therefore, when the user is connected to television 502, screen of television 502 can be used to access various functions of portable device 102a such as, but are not limited to, call receiving, dialing, browsing the phonebook, typing a message, browsing the Internet, and so forth. This functionality increases the comfort in using the small form factor of portable device 102a. In an embodiment, the content of smart phone 102a displayed at screen of television 502 is not stored at television 502. For example, when a call is received at a smart phone from a calling party, a visual IVR menu of the calling party may be displayed at the screen of television 502. So, the user can see the visual IVR menu at a big screen of television and can interact with the visual menu accordingly.

In an embodiment, portable device 102a may include a detector for detecting television screen 502. The detector may be hardware, an application stored as software, a firmware on portable device 102, or a combination thereof. Further, portable device 102a may include an interface to connect to television screen 502. The interface is configured to transmit or receive one or more control signals excluding the data. In an embodiment, the interface can be hardware such as a Universal Serial Bus (USB) docket or a software application. Further, portable device 102a may include a controller which is configured to enable controlling of portable device 102a from television screen 502; and controlling of television screen 502 from portable device 102a through the interface. The controller may be hardware, an application stored as software, a firmware on portable device 102, or a combination thereof.

In another embodiment of the invention, portable device 102a may detect a picture frame 602 and connect the picture frame 602 to portable device 102a (the smart phone), as shown in FIG. 6. The connection between portable device 102a (the smart phone) and picture frame 602 can be wireless or wired. The wireless connection may be established by using Bluetooth, Wi-Fi, NFC, and so forth. The wired connection may be established via USB or using a cable wire. In an embodiment, picture frame 602 may be a digital picture frame. The digital picture frame is a picture frame which may be used to display images or photos without the need of printing or using them on computer. Once connected, display of picture frame 602 may be used to display content of portable device 102a. Further, the content of smart phone 102a is never stored at the connected external device 106a-n such as picture frame 602.

In another embodiment of the invention, portable device 102a (smart phone) may detect and connect to a Global Positioning System (GPS) navigation system 702 as shown in FIG. 7. Therefore, when the user is connected to GPS navigation system 702, screen of GPS navigation system 702 may be used for displaying content of display of portable device 102a. Further, screen of GPS navigation system 702 can be used to access various functions of portable device 102a such as call receiving, browsing the phonebook, browsing the Internet, and so forth. This functionality increases the comfort in using portable device 102a such as the mobile phone which has limited display.

In an embodiment, smart phone may include a detector for detecting GPS navigation system 702. The detector may be hardware, an application stored as software, a firmware on portable device 102, or a combination thereof. Further, smart phone may include an interface to connect to GPS navigation system 702. The interface is configured to transmit or receive one or more control signals excluding the data. In an embodiment, the interface can be hardware such as a Universal Serial Bus (USB) docket or a software application. Further, smart phone may include a controller which is configured to enable controlling of smart phone a from GPS navigation system 702; and controlling of GPS navigation system 702 from smart phone through the interface. The controller may be hardware, an application stored as software, a firmware on portable device 102, or a combination thereof.

In yet another embodiment of the invention, smart phone 102a can detect and connect to a projector 802 as shown in FIG. 8. Portable device 102a can search for an external device 106 such as projector 802. In an embodiment, portable device 102a may include a detector for detecting to an external device 106 or external devices 106a-n. The detector may be hardware, an application stored as software, a firmware on portable device 102, or a combination thereof. Further, portable device 102a may connect to projector 802 using any of wired or wireless connection. Further, projector 802 is configured to connect to connect to Visuphone 104 of smart phone. Further, portable device 102a such as smart phone may include an interface to connect to projector 802. The interface is also configured to transmit or receive one or more control signals excluding the data. Further, portable device 102a may include a controller which is configured to enable controlling of portable device 102a from projector 802; and controlling of projector 802 from portable device 102a through the interface. The controller may be hardware, an application stored as software, a firmware on portable device 102, or a combination thereof.

Projector 802 may be connected to a display 804. Similarly, the connection between projector 802 and display 804 can be wired or wireless. Further, projector 802 can project the display of smart phone 102a on display 804. Further, one or more functions of projector 802 may be controlled by using connected smart phone 102a. Further, the content of smart phone 102a is never stored at the connected external device 106a-n (such as projector 802).

FIG. 9 illustrates exemplary display of an Interactive Voice Response (IVR) menu on a large display screen 902 connected to a portable device 102a, in accordance with an embodiment of the invention. As discussed with reference to FIG. 5, Visuphone 104 is configured to display a visual IVR menu associated with a phone number of a dialed destination or a calling party at portable device 102a. Further, the visual IVR menus are stored at the portable device 102a. In an embodiment, portable device 102a can detect and connect to external devices 106a-n such as large display screen 902, configured to connect to portable device 102a. After establishing a connection with large display screen 902, Visuphone 104 can display visual IVR menu displayed at portable device 102a at large display screen 902. Large display screen 902 may be used to display content of portable device 102a, but the content is never transferred or stored at large display screen 902 (or external devices 106a-n). Large display screen 902 can be a screen of any of external devices 106a-n. Portable device 102a can be a smart phone, a mobile phone, a pager, and so forth. A visual IVR menu 904a is a visual menu including one or more options at portable device 102a. A visual IVR menu 904b is a visual menu at large display screen 902 corresponding to visual IVR menu 904a. Displaying visual IVR menu of mobile phone on large display screen 902 enhances visibility.

Further, portable device 102*a* may include a controller for controlling one or more functions of connected large display screen 902. The controller may be hardware, an application stored as software, a firmware on portable device 102, or a combination thereof.

FIG. 10 illustrates a block diagram of portable device 102, in accordance with an embodiment of the invention. Portable device 102 can connect to Public Switched Telephone Network (PSTN) 1016 through a radio interface 1012 in a wired or wireless manner. For example, radio interface 1012 may provide 2G, 3G, and/or 4G connectivity in case of portable device 102 being a mobile phone. Moreover, a network interface 1014 can be used to connect portable device 102 to a network 1018. Examples of network 1018 include wireless or wired networks such as Local Area Network (LAN), Personal Area Network (PAN), or other specialized networks. FIG. 11 shows when network 1018 is a wireless network 1102. Network interface 1014 may allow connectivity through various protocols such as TCP/IP, Bluetooth, acoustic signals, or other types of radio signals. For example, portable device 102 may connect to a television through Bluetooth for displaying the contents of portable device 102.

Portable device 102 includes a display 1002 to output graphical information to the user. In an embodiment of the invention, display 1002 may include a touch sensitive screen. A memory 1006 of portable device 102 stores various programs, data and/or instructions that can be executed by a processor 1004. Examples of memory 1006 include, but are not limited to, a Random Access Memory (RAM), a Read Only Memory (ROM), a hard disk, and so forth. A person skilled in the art will appreciate that other types of computer-readable media which can store data that is accessible by portable device 102, such as magnetic cassettes, flash memory cards, digital video disks, and the like, may also be used by portable device 102. Further, memory 1006 may include an OS 1010. Further, other applications such as instant messaging application, browser, and so forth may be available on portable device 102. Processor 1004 may include a connection manager 1008 that enables portable device 102 to connect to external devices 106*a-n* through network interface 1014. In an embodiment of the invention, connection manager 1008 may be implemented as a second processor in portable device 102. Further, portable device 102 can transmit to or receive multiple control signals from external devices 106*a-n*. The multiple control signals are the signals for displaying content of portable device 102 at the connected external device such as external device 106*b*.

Portable device 102 includes a system bus 1020 for connecting the components. Examples of system bus 1020 include several types of bus structures including a memory bus or memory controller, a peripheral bus, or a local bus using any of a variety of bus architectures.

In an embodiment, portable device 102 may include a detector for detecting one or more external devices 106*a-n*. The detector may be hardware, an application stored as software, a firmware on portable device 102, or a combination thereof. Further, portable device 102 may include an interface to connect to at least one external device of external devices 106*a-n*. The interface is further configured to transmit or receive one or more control signals excluding the data. Further, portable device 102 may include a controller which is configured to enable controlling of portable device 102 from the at least one external device; and controlling of the at least one external device from portable device 102 through the interface. The controller may be hardware, an application stored as software, a firmware on portable device 102, or a combination thereof.

FIG. 12 illustrates another environment 1200 where various embodiments of the invention may function. As shown, environment 1200 includes portable device 1202 that can be used by a user through a user device 1204. Examples of user device 104 include but are not limited to a mobile phone, a smart phone, a Personal Desktop Assistant (PDA), a tablet Personal Computer (PC), and so forth. User device 1204 may be used for communication such as data and voice communications over a Public Switched Telephone Network (PSTN), mobile network, the Internet, the Ethernet, and so forth. User device 1204 may be connected to multiple external device 1206*a-n* through portable device 1202.

In an embodiment of the invention, portable device 1202 may include an Operating System (OS) such as, but not limited to, Windows Mobile, Apple iOS, Google Android, Symbian, and so forth. Examples of external devices 1206*a-n* include, but are not limited to, a display screen, a keyboard, a mouse, and so forth. In an embodiment of the invention, portable device 1202 may include a dock for receiving user device 1204.

In an embodiment, portable device 1202 may include a detector for detecting external devices 1206*a-n* such as laptop 302 or large screen 402. Further, the detector may be configured to detect user device 1204. The detector may be hardware, an application stored as software, a firmware on portable device 1202, or a combination thereof. Further, portable device 1202 may include an interface to connect to at least one external device of external devices 1206*a-n*. Further, the interface may be configured to connect to user device 1204. The interface is also configured to transmit or receive one or more control signals excluding the data. In an embodiment, the interface can be hardware such as a Universal Serial Bus (USB) docket or a software application. Further, portable device 1202 may include a controller which is configured to enable controlling of portable device 1202 from the at least one external device such as laptop 302; and controlling of the at least one external device from portable device 1202 through the interface. The controller may be configured to enable controlling of portable device 1202 from user device 1204 through the interface; and to enable controlling of portable device 1202 from user device 1204. The controller may be hardware, an application stored as software, a firmware on portable device 1202, or a combination thereof.

In an embodiment, portable device 1202 may include a Visuphone 1208 that is configured to display a visual IVR menu associated with a phone number of the dialed destination or calling party. Further, portable device 1202 stores a plurality of visual IVR menus corresponding to one or more phone numbers associated with the dialed destination or calling parties. When a call is received at portable device 1202, Visuphone 1208 can search for a visual IVR menu corresponding to the received phone number in a database at portable device 1208. Thereafter, Visuphone 1208 can display the visual IVR menu at the screen of portable device 1208.

In an embodiment, portable device 1202 may detect one or more external devices 1206*a-n*. Further, portable device 1202 may connect to external devices 1206*a-n* by using an Ethernet cable, a video cable, Universal Serial Bus (USB), and so forth. Therefore, the display on the screen of user device 1204 and/or portable device 1202 can be presented on external device 1206*a* such as a display screen. Moreover, external device 1206*b* such as a mouse connected to portable device 1202 can be used to provide inputs that is reflected on the display screen. As a result, portable device 1202 acts as a universal communication hub that can enable interaction of multiple external device 1206*a-n* among each other and also among various user devices and external devices 1206*a-n*.

In an embodiment, the connected external devices may be used for displaying the content of the user device, but the connected external devices may not store the content. The storage of content will always remain on the user device only. For example, the user is accessing the internet from an external internet café. Suppose the user wants to send a picture stored in the mobile phone through an e-mail. Then, the mobile phone can directly connect to computer or computer peripherals of the cafe. Thereafter, the user can search and select the picture stored at the mobile phone by using the computer screen and mouse or keyboard and can attach in the e-mail. The picture is not copied to the computer memory; it always remains on mobile phone's memory. This way the picture from the mobile phone can be mailed by using the computer of the café. This feature of the portable device enhances security as the content from the user device is never transferred or stored on the computer of café.

Portable device 1202 may detect and/or connect to at least one of the plurality of external devices 1206*a-n* by using Bluetooth, Wi-Fi, Infrared, or other wireless protocols. Portable device 1202 is further configured to transmit to or receive one or more control signals excluding data. In an embodiment, the control signals are transmitted to or received from at least one external device of the plurality of external devices 1206*a-n* connected to portable device 1202. In an embodiment, the one or more control signals are signals for controlling mouse events. In another embodiment of the invention, the one or more control signals are signals for controlling one or more key presses at a keypad. In yet another embodiment, the one or more control signals are the signals for displaying content at the at least one external device. The content is not stored at the at least one external device. In another embodiment of the invention, the one or more control signals are the signals for displaying content of portable device 1202. The displayed content is stored at portable device 1202 and not transferred or stored at the at least one external device.

In another embodiment of the invention, the one or more control signals are transmitted to or received from user device 1204 connected to portable device 1202. In another embodiment of the invention, the one or more control signals are the signals for displaying content of user device 1204 at the at least one external device. The displayed content is stored at user device 1204 and not transferred or stored at the at least one external device.

FIG. 13 illustrates yet another environment 1300 where various embodiments of the invention may function. As shown, user device 1204 may be connected to portable device 1202 via a network 1302. Network 1302 can be the Internet, LAN, MAN, and so forth. In an embodiment, user device 1204 and portable device 1202 may be separated by a large distance. Further, user device 1204 is configured to connect to portable device 1202. Further, portable device 1202 is configured to search for available one or more devices such as external devices 1206*a-n* and user device 1204. In an embodiment, portable device 1202 may include a detector for detecting external devices 1206*a-n*. The detector may be hardware, an application stored as software, a firmware on portable device 1202, or a combination thereof.

Further, portable device 1202 may include an interface to connect to at least one external device of external devices 1206*a-n*. Further, the interface may also be configured to connect to user device 1204. The interface is also configured to transmit or receive one or more control signals excluding the data. In an embodiment, the interface can be hardware such as a Universal Serial Bus (USB) docket or a software application. Further, portable device 1202 may include a controller which is configured to enable controlling of portable device 1202 from the at least one external device such as laptop 302; and controlling of the at least one external device from portable device 1202 through the interface. In an embodiment, the controller may also be configured to enable controlling of portable device 1202 from user device 1204 through the interface; and to enable controlling of portable device 1202 from user device 1204. The controller may be hardware, an application stored as software, a firmware on portable device 1202, or a combination thereof.

Visuphone 1208 may also display a visual IVR menu associated with a calling or dialed party or communication device. Further, the connected external device 1206*a-n* can display the content of the connected user device 1204 without storing the content. Moreover, the content remains at and is stored at user device 1204. Portable device 1202 can transmit or receive one or more control signals from user device 1204. Similarly, portable device 1202 can transmit or receive control signals from the at least one external device or external devices 1206*a-n*.

FIG. 14 illustrates exemplary functioning of portable device 1202 connected to a mobile phone 1402 and a computer in the environment as discussed in conjunction with FIG. 12 or FIG. 13. As shown, user device 1204 such as mobile phone 1402 may connect to display screen 202, keyboard 204, and mouse 206 of the computer through portable device 1202. As shown, portable device 1202 may include Visuphone 1208 for displaying a visual IVR menu on screen 202. Therefore, after establishing connection between mobile phone 1402 and portable device 1202, the screen of mobile phone 1402 can be displayed on a larger screen of display screen 202 or monitor. Portable device 1202 can receive from or transmit one or more signals to display screen 202, keyboard 204, and mouse 206. Moreover, a user can use keyboard 204 and mouse 206 to access the information through portable device 1202. For example, in this configuration, the user can browse the Internet by using display screen 202, keyboard 204, and mouse 206, while mobile phone 1402 provides the Internet connectivity and portable device 1202 provides the connectivity among mobile phone 1402 (or user device 1204), display screen 202, keyboard 204 and mouse 206. Therefore, a computer other than mobile phone 1402 and portable device 1202 may not be required by the user. In an embodiment, mobile phone 1402 (or user device 1204) may not include a Visuphone. In an embodiment, multiple mobile phones may be configured to connect to portable device 1202. Further, user device 1204 such as mobile phone 1402 can transmit to or receive control signals from portable device 1202. Based on the control signals content of mobile phone 1402 may be displayed at display screen 202

In an embodiment of the invention, the content displayed at the external device of devices 1206*a-n* is not stored at the connected external device or devices 1206*a-n*. In another embodiment of the invention, the user may use the features or functions of the connected external devices. Further, by connecting to the external device the user at the user device can use the high computation functionality of the external device. For example, if a mobile phone do not have the internet facility than, by connecting the device to a large screen configured to connect to the internet, the user can access the internet. This may also enhance visibility of web pages on large screen. As the mobiles have a limited screen size.

In an embodiment of the invention, portable device 1202 can provide connectivity to multiple user devices. For example, in a home environment, portable device 1202 may detect multiple mobile phones and wired phone. Therefore, the screen of a mobile phone may be displayed on a television near to that mobile phone. In another embodiment of the invention, portable device 1202 may enable communication among multiple user devices. Further, the multiple user devices are configured to connect to portable device 1202.

In an embodiment, portable device 1202 may include a detector for detecting external devices 1206a-n such as a computer. Further, the detector may be configured to detect user device 1204 such as mobile phone 1402. The detector may be hardware, an application stored as software, a firmware on portable device 1202, or a combination thereof. Further, portable device 1202 may include an interface to connect to at least one external device of external devices 1206a-n. Further, the interface may be configured to connect to mobile phone 1402. The interface is configured to transmit or receive one or more control signals excluding the data from at least one of mobile phone 1402 and the at least one external device. In an embodiment, the interface can be hardware such as a Universal Serial Bus (USB) docket or a software application. Further, portable device 1202 may include a controller which is configured to enable controlling of portable device 1202 from the at least one external device such as a computer; and controlling of the at least one external device from portable device 1202 through the interface. The controller may be configured to enable controlling of portable device 1202 from the at least one external device through the interface; and to enable controlling of portable device 1202 from the connected at least one external device. The controller may be hardware, an application stored as software, a firmware on portable device 1202, or a combination thereof.

FIG. 15 illustrates exemplary functioning of portable device 1202 connected to mobile phone 1402 and a projector 1502 in the environment as discussed in conjunction with FIG. 12 or FIG. 13. Portable device 1202 may be connected to projector 1502, and to a user device such as mobile phone 1402. Further, projector 1502 may be connected to a bigger display 1504. Once all the devices are connected, display of mobile phone 1402 may be displayed on bigger display screen 1504. Further, portable device 1202 may exchange one or more control signals with projector 1502 and mobile phone 1402. Portable device 1202 is configured to detect and connect to the configured devices i.e. mobile phone 1402 (or user device) and projector 1502. Thereafter, one or more functions of mobile phone 1502 can be controlled by using projector 1502 and vice versa. Further, a display of content of mobile phone 1402 may be produced at display 1504 connected to projector 1502.

FIG. 16 illustrates exemplary functioning of portable device 1202 connected to mobile phone 1402 and large screen 402 in environment 1200, in accordance with an embodiment of the invention. As shown, portable device 1202 may detect an external device such as a large screen 402. A user device such as a mobile phone 1402 can be connected to large screen 402 via portable device 1202. Mobile phone 1402 is configured to connect with portable device 1202. Similarly, large screen 402 is also configured to connect to portable device 1202. Further, portable device 1202 can exchange a plurality of control signals with mobile phone 1402 and/or large screen 402. In an embodiment, the plurality of control signals may be signals to display content of a screen of user device such as mobile phone 1402. Further, the connection between portable device 1202 and mobile phone 1402 can be wired or wireless. Furthermore, the connection between portable device 1202 and large screen 402 can be wired or wireless. Thereafter, display of mobile phone 1402 may be displayed on large screen 402 after being connected to portable device 1202.

In an embodiment of the invention, external device 1206a-n such as a television 502 may be connected to user device such as mobile phone 1402 via portable device 1202 as shown in FIG. 17. Further, mobile phone 1402 and television 502 are configured to connect with portable device 1202. In an embodiment of the invention, mobile phone 1402 may include a Visuphone. Though not shown, any user device other than mobile phone 1402 may be connected to portable device 1202. Further, when connected to television 502, the content of mobile phone 1402 may be displayed at screen of television 502. For example, if a user receives a message at a mobile phone 1402, than the message will be displayed at television 502. Further, usually mobile phone 1402 has limited display capabilities. By connecting the mobile phone with television, the display of contents of mobile phone 1402 can be enhanced. For example, when a call is received from a service provider implementing an Interactive Voice Response (IVR) system, then a visual menu will be displayed at the screen of television 502. Further, if the visual menu has many options then the visual menu may be displayed as two or more pages or screens on the external device 1206. The user can move from one screen to another by dragging.

FIG. 18 illustrates exemplary functioning of portable device 1202 connected to mobile phone 1402 and laptop 302 in the environment of FIG. 12 or FIG. 13, in accordance with another embodiment of the invention. A communication session between mobile phone 1402 and laptop 302 may be established via portable device 1202. Mobile phone 1402 is configured to connect with portable device 1202. Similarly, laptop 302 is also configured to connect to portable device 1202. After getting connected to each other via portable device 1202 contents of mobile phone 1402 may be displayed on screen of laptop 302.

In an embodiment, portable device 1202 may include a detector for detecting laptop 302. Further, the detector may be configured to detect a user device 1204 such as mobile phone 1402. The detector may be hardware, an application stored as software, a firmware on portable device 1202, or a combination thereof. Further, portable device 1202 may include an interface to connect to laptop 302. Further, the interface may be configured to connect to mobile phone 1402. The interface is configured to transmit or receive one or more control signals excluding the data. In an embodiment, the interface can be hardware such as a Universal Serial Bus (USB) docket or a software application. Further, portable device 1202 may include a controller which is configured to enable controlling of portable device 1202 from the laptop 302; and controlling of laptop 302 from portable device 1202 through the interface. The controller may be configured to enable controlling of portable device 1202 from mobile phone 1402 through the interface; and to enable controlling of portable device 1202 from mobile phone 1402. The controller may be hardware, an application stored as software, a firmware on portable device 1202, or a combination thereof.

FIG. 19 illustrates exemplary functioning of portable device 1202 connected to a picture frame 602 and a telephone 1902 in the environment of FIG. 12 and FIG. 13, in accordance with another embodiment of the invention. Picture frame 602 may be connected to a user device such as a wired telephone 1902 via portable device 1202 as shown in FIG. 19. As shown, portable device 1202 may detect an external device such as wired telephone 1902 and connect to it. Further, portable device 1202 may detect and connect to an external device such as picture frame 602. Portable device can transmit to or receive control signals to and from mobile phone 1402 and/or picture frame 602. A display of content of a screen of telephone 1902 may be displayed at picture frame 602 based on control signals.

According to yet another embodiment of the invention, external device such as a GPS navigation system 702 may be connected to a user device such as mobile phone 1402 via portable device 1202 as shown in FIG. 20. Both the devices i.e. GPS navigation system 702 and mobile phone 1402 are configured to connect to portable device 1202. Once connected to portable device 1202, contents of mobile phone 1402 may be displayed by using screen of GPS navigation system 702. For example, when a call is received at mobile phone 1402, an IVR menu associated with the calling party may be displayed at screen of GPS navigation system 702.

FIG. 21 illustrates an exemplary functioning of portable device 1202 connected to large screen 402 and laptop 302 in the environment of FIG. 12 and FIG. 13. As shown in FIG. 21, a connection may be established between laptop 302 and large screen 402 via portable device 1202. The connection can be wireless or wired. After establishing the connection, the content stored at laptop 302 may be displayed at large screen 402. Further, while displaying the content of laptop 302, large screen 402 may not store the content. For example, if a user wants to watch a movie stored at laptop, he/she can do by connecting the laptop to the portable device (via wireless or wired connection). This way large screen 302 can display movie without storing or saving movie in or at large screen 402. Further, portable device 1202 can include an interface to transmit to or receive multiple control signals from external devices 1206a-n such as large screen 302. The multiple control signals are the signals for displaying content of user device 1204 at the connected external device such as external device 1206b. In an embodiment, the interface can be hardware such as a Universal Serial Bus (USB) docket or a software application.

In an embodiment, laptop 302 may include a Visuphone and the connection may be established directly between laptop 302 (including Visuphone) and large screen 402 as shown in FIG. 22. In such a case the laptop 302 is configured to detect external devices and can connect to detected external device. Further, the connection may be a wireless connection or a wired connection. After connecting with large screen 402, the content stored at laptop 302 may be displayed by using large screen 402. Further, the content stored at laptop 302 such as pictures, movies, music files etc are never transferred to memory of external devices (such as large screen 402).

FIG. 23 illustrates an exemplary display of a visual Interactive Voice Response (IVR) menu on a large display screen 2304 connected to a portable device such as smart phone 2302, in accordance with an embodiment of the invention. Visuphone 1208 is configured to display visual IVR menu associated with the dialed destination or the calling party at portable device 1202. Display 2306a is a display of a visual IVR menu on smart phone 2302. Display 2306b is the display of the visual IVR menu on large display screen 2302 corresponding to display 2306a of smart phone 2302. Further, the visual IVR menu may include hundreds of options and may be big enough not to fit on a single screen. In such a case the visual IVR menu can be displayed as interlinked multiple screens. And the user can switch between these multiple screens.

FIG. 24 illustrates a block diagram of portable device 1202, in accordance with an embodiment of the invention. Network interface 2410 can be used to connect portable device 1202 to network 2412. Examples of network 2412 include wireless or wired networks such as Local Area Network (LAN), Personal Area Network (PAN), Bluetooth, or other specialized networks. A network interface 2410 may allow connectivity through various protocols such as TCP/IP, Bluetooth, acoustic signals, or other types of radio signals. For example, portable device 1202 may connect a mobile phone to a television through a Bluetooth communication link. As a result, the contents on screen of the mobile phone can be displayed on the television screen which is larger than that of the mobile phone. In an embodiment of the invention, portable device 1202 can use different protocols for communicating with different devices based on their capabilities. For example, portable device 1202 may connect to a mobile phone through Bluetooth and the television through Wi-Fi.

Portable device 1202 includes a memory 2404 to store various programs, data and/or instructions that can be executed by a processor 2402. Examples of memory 2404 include, but are not limited to, a Random Access Memory (RAM), a Read Only Memory (ROM), a hard disk, and so forth. A person skilled in the art will appreciate that other types of computer-readable media which can store data that is accessible by portable device 1202, such as magnetic cassettes, flash memory cards, digital video disks, and the like, may also be used by portable device 1202. Memory 2404 may include an OS 2408. Further, other applications such as instant messaging application, browser, and so forth may be available on portable device 1202. Processor 2402 may include a connection manager 2406 that enables portable device 1202 to connect to external devices 1206a-n through network interface 2410. In an embodiment of the invention, connection manager 2406 may be implemented as a second processor in portable device 1202.

Portable device 1202 includes a system bus 2414 for connecting the components. Examples of system bus 2414 include several types of bus structures including a memory bus or memory controller, a peripheral bus, or a local bus using any of a variety of bus architectures.

In an embodiment, portable device 1202 may include a detector for detecting one or more external devices 1206a-n. Further, the detector is also configured to detect user device 1204. The detector may be hardware, an application stored as software, a firmware on portable device 1202, or a combination thereof. Portable device 1202 may also include an interface for connecting to the one or more external device 1206a-n. The interface is also configured to connect to user device 1204. The interface can also transmit to and receive one or more control signals from user device 1204 and connected external devices 1206a-n. In an embodiment, the interface can be hardware such as a Universal Serial Bus (USB) docket or a software application. Portable device 1202 may also include a controller for controlling the connected devices such as user device 1204 and external devices 1206a-n. The controller can also enable controlling of portable device 1202 from user device 1204 and the connected external devices 1206a-n. The controller may be hardware, an application stored as software, a firmware on portable device 1202, or a combination thereof.

FIG. 25 is a flow diagram illustrating the functioning of portable device 102 in accordance with an embodiment of the invention. As discussed with reference to FIG. 1, portable device 102 includes Visuphone 104 configured to display a visual IVR menu at portable device 102. Further, portable device 102 is configured to detect and connect to any one of external devices 106a-n.

At step 2502, portable device 102 searches for an external device 106 which is configured to connect to portable device 102. For example, a detector present in a smart phone can search for an external device such a large display screen, a laptop, a computer, and so forth. The detector may be hardware, an application stored as software, a firmware on portable device 102, or a combination thereof. At step 2504, it is checked whether the external device is available. In an embodiment, the availability of external device is checked within a predefined distance such as within 50 meters, 10 meters, and so forth. If the external device is detected, portable device 1202 connects to the external device at step 2506, else control goes back to step 2502. Portable device 1202 includes an interface for connecting to the external device. Further, the interface can transmit or receive one or more control signals from the external device. In an embodiment, the interface can be hardware such as a Universal Serial Bus (USB) docket or a software application.

Thereafter, at step 2508 contents of display screen of portable device 1202 are displayed at the connected external device based on the control signals. For example, when connected to a laptop, the content of smart phone is displayed on the laptop screen. Portable device 1202 may also include a controller for enabling controlling of portable device from the connected external device and vice versa. The controller may be hardware, an application stored as software, a firmware on portable device 102, or a combination thereof.

FIGS. 26A and 26B is a flow diagram illustrating the functioning of portable device 1202 in the environment 1200, in accordance with another embodiment of the invention. Portable device 1202 includes a Visuphone 1208 for displaying a visual IVR menu associated with phone number of dialed destination or calling party. Portable device 1202 is configured to detect and connect to one or more devices such as external devices 1206*a-n*, user device 1204, and so forth.

At step 2602, portable device 1202 searches for a user device 1204. At step 2604, it is checked whether user device 1204 is available. A detector at portable device searches and detects user device 1204. The detector may be hardware, an application stored as software, a firmware on portable device 1202, or a combination thereof. If user device 1204 is available than a connection is established between portable device 1202 and detected user device 1204 at step 2606 else control goes back to step 2602.

At step 2608, portable device 1202 searches for an external device. At step 2610, it is checked whether the external device 1206 such as external device 1206*b* is available. The detector of portable device 1202 may search and detect an external device. If external device 1206 is available, then the process control goes to step 2612 else the control goes back to step 2608. At step 2612, a connection is established between portable device 1202 and the detected external device 1206*b*. Portable device 1202 includes an interface configured to connect to detected external device 120*b*. The interface is also configured to transmit or receive one or more control signals from user device 1204 and the connected external device 1206*b*. In an embodiment, the interface can be hardware such as a Universal Serial Bus (USB) docket or a software application. Thereafter, contents of display of connected user device 1204 are displayed on a screen of the connected external device 1206*b*. In an embodiment of the invention, the content is displayed at the connected external device 1206*b* based on the one or more control signals. For example, contents of a mobile phone may be displayed on a screen of a television which is connected to the television via portable device 1202. Portable device 1202 may also include a controller for enabling controlling of portable device from at least one of user device and connected external device and vice versa. The controller may be hardware, an application stored as software, a firmware on portable device 1202, or a combination thereof.

The invention claimed is:

1. A portable device comprising connection to digital network, processor, touch sensitive screen and memory, wherein said memory comprises instructions to transfer information been displayed on said screen to a home appliance, wherein said transfer comprises said digital network, wherein said home appliance is one of the following: picture frame, television, home computer, Global Position System (GPS) or projector, wherein said information is being part of an on-going communication session with an external destination, and wherein said external destination is an Interactive-Voice-Response destination.

2. A portable device according to claim 1, wherein said communication session comprises a telephone call.

3. A portable device according to claim 1, wherein said memory comprises instructions to fetch from a database a data-file related to said external destination, and wherein said information comprises a portion related to said data-file.

4. A portable device according to claim 1, wherein said memory comprises instructions to search for said home appliance.

5. A portable device according to claim 1, wherein said information comprises visual menu.

6. A non transitory tangible computer readable medium comprising instructions for the execution according to claim 1.

7. A portable device comprising a screen, a connection to a digital network, a processor, and a memory, wherein said memory comprises instructions to transfer information been displayed on said screen to another device, wherein said transfer utilizes said digital network, wherein said another device has a larger display than said portable device, and wherein said information comprises a visual menu and is being part of an on-going communication session with external destination which comprise Interactive Voice Response (IVR).

8. A portable device according to claim 7, wherein said communication session comprises a voice call.

9. A portable device according to claim 7, wherein said memory comprises instructions to fetch from a database a visual menu file.

10. A portable device according to claim 7, wherein said memory comprises instructions to search, in a close proximity for another device with a larger display than said portable device display.

11. A portable device according to claim 7, wherein said another device is one of the following: a picture frame, a navigation system (GPS), a computer or a projector.

12. A non transitory tangible computer readable medium comprising instructions for the execution according to claim 7.

13. A portable device comprising a screen, a connection to a digital network, a processor, and a memory, wherein said memory comprises instructions to transfer information been displayed on said screen to another device, wherein said transfer utilizes said digital network, wherein said information is being part of an on-going communication session with an external destination, wherein said another device is one of the following:

home appliance, car appliance, or office appliance, and wherein said external destination is external to said home or said car or said office, wherein said external destination is an Interactive-Voice-Response destination.

14. A portable device according to claim 13, wherein said communication session comprise a telephone call.

15. A portable device according to claim 13, wherein said memory comprises instructions to fetch from a database a visual menu file related to said external destination.

16. A portable device according to claim 13, wherein said memory comprises instructions to detect user selection of an item of said information been displayed and communicate said selection to said external destination.

17. A portable device according to claim 13, wherein said another device is one of the following: a picture frame, a television, a navigation system (GPS), a computer or a projector.

18. A non transitory tangible computer readable medium comprising instructions for the execution according to claim 13.

\* \* \* \* \*